(12) United States Patent
Vetrovec

(10) Patent No.: US 6,888,872 B2
(45) Date of Patent: May 3, 2005

(54) SOLID-STATE LASER OSCILLATOR WITH GAIN MEDIA IN ACTIVE MIRROR CONFIGURATION

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 10/424,057

(22) Filed: Apr. 25, 2003

(65) Prior Publication Data

US 2003/0198265 A1 Oct. 23, 2003

Related U.S. Application Data

(62) Division of application No. 09/861,363, filed on May 18, 2001, now Pat. No. 6,603,793.

(51) Int. Cl.[7] .............................. H01S 3/08; H01S 3/04
(52) U.S. Cl. .......................................... 372/95; 372/35
(58) Field of Search ............................ 372/35, 95, 70, 372/34

(56) References Cited

U.S. PATENT DOCUMENTS

| | | | |
|---|---|---|---|
| 3,361,362 A | | 1/1968 | Almasi et al. |
| 4,029,400 A | * | 6/1977 | Eitel .......................... 359/845 |
| 4,084,883 A | | 4/1978 | Eastman et al. |
| 4,175,834 A | * | 11/1979 | Sigman et al. .............. 359/845 |
| 4,657,358 A | | 4/1987 | Anthony et al. |
| 4,837,771 A | | 6/1989 | Baer |
| 4,849,036 A | | 7/1989 | Powell et al. |
| 4,876,694 A | | 10/1989 | Hughes |
| 4,944,580 A | | 7/1990 | MacDonald et al. |
| 5,335,237 A | | 8/1994 | Zapata |

(Continued)

OTHER PUBLICATIONS

Article entitled "Composite Thin–Disk Laser Scaleable to 10 kW Average Power Output and beyond" by Luis Zapata, Ray Beach and Steve Payne, Lawrence Livermore National Laboratory, 5 pages, no month, year.

Article entitled "Review and forecast of laser markets Part 1: Nondiode lasers" by Stephen G. Anderson dated Jan. 2000, pp. 92–99.

Article entitled "Solid State Thin Disc Laser" by H. Hugel and W.L. Bohn from SPIE vol. 3574, no months, year.

Department of Defense—Report of the High Energy Laser Executive Review Panel entitled "Department of Defense Laser Master Plan" dated Mar. 24, 2000.

Primary Examiner—Paul Ip
Assistant Examiner—Hung T Vy
(74) Attorney, Agent, or Firm—Harness Dickey & Pierce P.L.C.

(57) ABSTRACT

An apparatus and method for achieving a near diffraction-limited, high-average power output from a solid-state laser oscillator are provided. The solid-state laser uses multiple disk-shaped laser gain media having a large optical aperture placed in an unstable resonator. The laser gain media is provided with optical coatings for operation in the active mirror configuration and is attached to a rigid, cooled substrate, which allows it to maintain a prescribed shape even when experiencing significant thermal load. The resonator is configured so as to preferentially support low order optical modes with transverse dimensions sufficiently large to efficiently fill the gain media apertures. Resonator configurations capable of producing standing wave or traveling wave optical fields are disclosed. The resonator may include means for intracavity correction of an optical phase front by adaptive optics. Also disclosed is an arrangement of resonator gain elements in axisymmetric arrays suitable for integration into a compact and lightweight laser system.

20 Claims, 13 Drawing Sheets

U.S. PATENT DOCUMENTS

| | | |
|---|---|---|
| 5,400,173 A | 3/1995 | Komine |
| 5,441,803 A | 8/1995 | Meissner |
| 5,553,088 A * | 9/1996 | Brauch et al. ............ 372/34 |
| 5,563,899 A | 10/1996 | Meissner et al. |
| 5,579,333 A | 11/1996 | Neil et al. |
| 5,610,751 A | 3/1997 | Sweeney et al. |
| 5,661,738 A | 8/1997 | Yasui et al. |
| 5,699,372 A | 12/1997 | Okazaki |
| 5,703,893 A | 12/1997 | Komiyama et al. |
| 5,796,761 A | 8/1998 | Injeyan et al. |
| 5,832,015 A | 11/1998 | Goto et al. |
| 5,846,638 A | 12/1998 | Meissner |
| 5,856,996 A | 1/1999 | Durkin et al. |
| 5,872,803 A | 2/1999 | Mori et al. |
| 5,872,804 A | 2/1999 | Kan et al. |
| 5,875,206 A | 2/1999 | Chang |
| 5,903,583 A | 5/1999 | Ullman et al. |
| 5,926,494 A * | 7/1999 | Pepper ............ 372/70 |
| 5,936,984 A | 8/1999 | Meissner et al. |
| 6,339,605 B1 | 1/2002 | Vetrovec |

\* cited by examiner

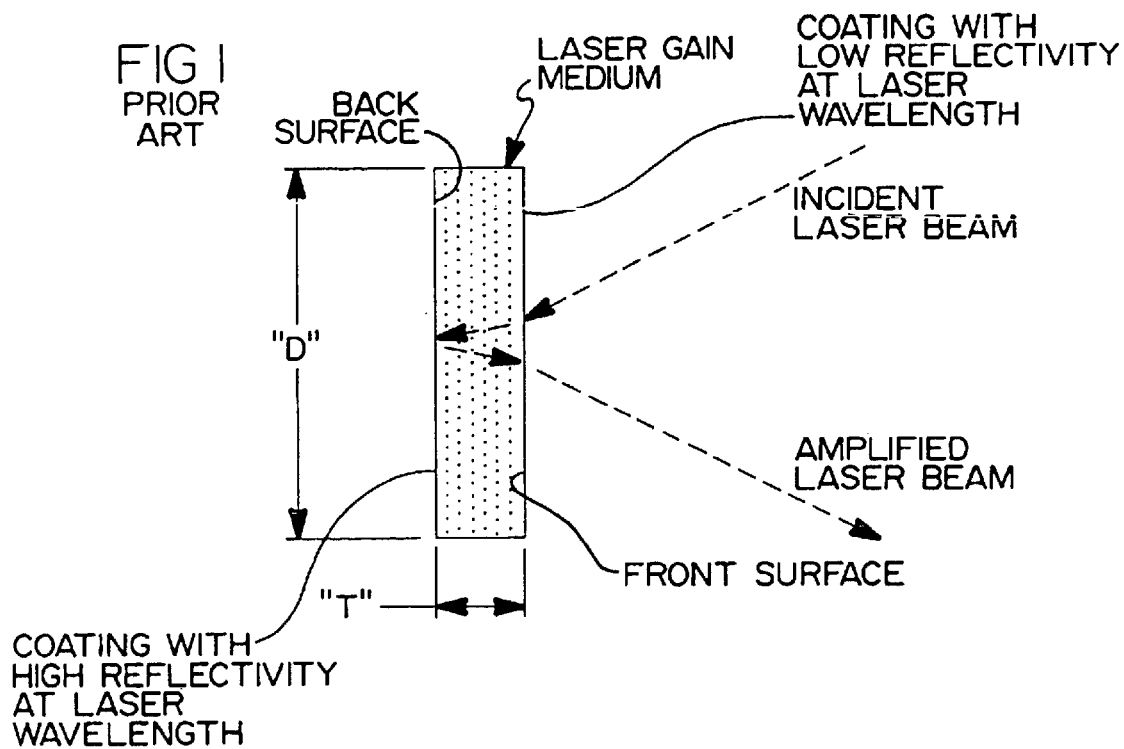
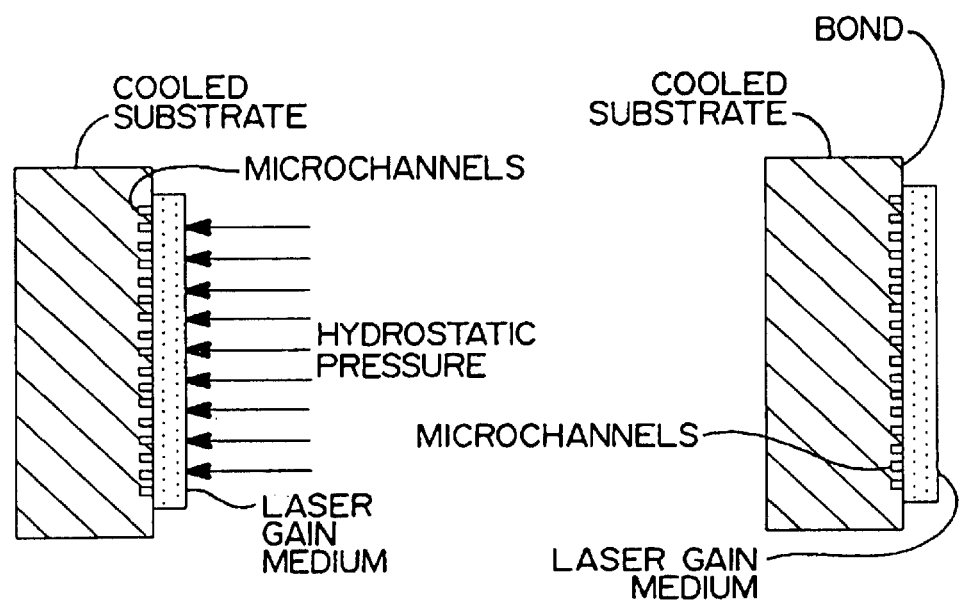

SOLID-STATE LASER OSCILLATOR WITH GAIN MEDIA IN ACTIVE MIRROR CONFIGURATION

CROSS REFERENCE TO RELATED APPLICATIONS

This application is a divisional of U.S. Ser. No. 09/861,363; filed May 18, 2001 now U.S. Pat. No. 6,603,793, presently allowed.

BACKGROUND OF THE INVENTION

Thermomechanical effects present a major challenge to developing a solid-state laser (SSL) for generation of high-average power (HAP) with near diffraction-limited beam quality (BQ). In particular, distortions to optical phase fronts caused by transverse temperature gradients within a SSL gain medium degrade beam quality (BQ) and render the output beam useless for many important applications. A class of SSL known as "active mirror amplifier" (AMA) has shown effective reduction of transverse temperature gradients and demonstrated generation of laser output with very good BQ. A general configuration of a laser gain medium in an active mirror (amplifier) configuration is disclosed in the prior art illustration of FIG. 1.

The AMA was first disclosed by Almasi et al. in U.S. Pat. No. 3,631,362 (1971). In the original AMA concept, a large aperture (up to 25 cm in diameter), edge-suspended, Nd-Glass disk (or slab) is pumped by flashlamps and liquid-cooled on its back face. These devices were used in a large-scale, giant pulse laser amplifier chain (rather than a laser oscillator) operating in a low-average power mode at a very low repetition rate (typically one pulse per hour). See for example, J. Abate et al., "*Active Mirror: A Large-Aperture Medium Repetition Rate Nd:Glass Amplifier*," Appl. Opt., vol. 20, no. 2, 351–361 (1981) and D. C. Brown et al., "*Active-Mirror Amplifier: Progress and Prospects*," IEEE J. of Quant. Electr., vol. 17., no. 9,1755–1765 (1981).

Brauch et al., in U.S. Pat. No. 5,553,088 (1996), discloses a variant of the AMA known as the "thin disk laser". This device uses a diode-pumped gain medium disk with a small optical aperture, typically a few millimeters in diameter and 200–400 micrometers in thickness, soldered to a heat sink. See, for example, A. Giesen et al., "*Scalable Concept For Diode-Pumped High-Power Lasers*," Appl. Phys. B vol. 58, 365–372 (1994). The prior art disclosed a laser oscillator using one or more of such disks made of Yb:YAG gain media placed in a stable resonator configuration. These devices demonstrated laser outputs approaching 1 kW average power and with a BQ around twelve times the diffraction limit. See, for example, C. Stewen et al., "*1-kW CW Thin Disk Laser*," IEEE J. of Selected Topics in Quant. Electr., vol. 6, no. 4, 650–657 (July/August 2000).

The applicant's first co-pending patent application, U.S. Ser. No. 09/505,399, entitled "Active Mirror Amplifier System and Method for a High-Average Power Laser System", which is hereby made a part hereof and incorporated herein by reference, discloses a new AMA concept suitable for operation at high-average power and good BQ. The invention uses a large-aperture solid-state laser gain medium disk about 2.5 mm in thickness and with a diameter typically between 5 and 15 cm, mounted on a rigid, cooled substrate, and optically pumped by semiconductor diodes. Pump power is injected into the front or back face of the disk. The disk is attached to the substrate by a hydrostatic pressure differential between the surrounding atmosphere and the gas or liquid medium in the microchannels embedded in the substrate.

The applicant's second co-pending patent application, U.S. Ser. No. 09/767,202, entitled "Side-Pumped Active Mirror Solid-State Laser for High-Average Power", which is hereby incorporated by reference, discloses a large aperture AMA wherein optical pump radiation is injected into the peripheral edge of a gain medium disk. Side-pumping takes advantage of the long absorption path (approximately the same dimension as the disk diameter), which permits doping the disk with a reduced concentration of lasant ions and provides a corresponding reduction in required pump radiation intensity.

The applicant's third co-pending patent application, U.S. Ser. No. 09/782,788, entitled "High-Average Power Active Mirror Solid-State Laser with Multiple Subapertures", which is hereby incorporated by reference, discloses an AMA wherein a very large optical aperture is filled by multiple AMA subapertures. This co-pending patent application also discloses an AMA with the laser gain medium disk attached to the substrate by a diffusion bond rather than by hydrostatic pressure.

The teachings of co-pending patent application Ser. No. 09/505,399, 09/767,202 and 09/782,788 provide numerous advantages over prior art solid-state lasers and allow generation of near diffraction limited laser output at very high average power from a relatively small device. In particular, analysis shows that an AMA module constructed in accordance with one or more of the above-referenced applications and using a Nd:GGG gain medium disk with a 15 cm diameter and 2.5 mm thickness can produce 15 kW of average laser power available for outcoupling with near diffraction limited BQ. See, for example, J. Vetrovec, "*Active Mirror Amplifier for High-Average Power*," in SPIE vol. 4270, 2001. Co-pending application U.S. Ser. No. 09/505,399 discloses explicitly how multiple AMA modules may be used to construct a laser amplifier, especially as may be suitable for a laser configuration known as a master-oscillator—power amplifier. There are, however, many important applications that would benefit from a HAP solid-state laser oscillator producing a near diffraction-limited BQ output beam.

A laser oscillator employs a laser gain medium inside an optical resonator of suitable configuration. Photons oscillating from one end of the resonator to the other end thereof constitute electromagnetic energy which forms an intense electromagnetic field. The shape of this field is precisely dependent not only upon the photon wavelength, but also upon the mirror alignment, curvature and spacing, as well as the optical aperture and inhomogenieties of the laser gain medium. This field can assume many different cross-sectional shapes, termed transverse electromagnetic modes (TEM), but only certain modes, or a mixture of them, are useful for utilizing the laser power.

In many laser applications, the most desirable mode is the fundamental mode (i.e., $TEM_{oo}$, Gaussian, or diffraction-limited mode), which also has the smallest transverse dimensions of all modes. In a laser oscillator, to enable extraction of a near diffraction-limited beam from a large-aperture gain medium it is necessary to design a resonator which supports a large size $TEM_{oo}$ mode under operational conditions. While laser gain elements in an AMA configuration may appear to be natural candidates for construction of a HAP SSL oscillator producing a near diffraction-limited BQ output beam, numerous challenges must be overcome, including:

1. While a large optical aperture of the AMA gain medium is essential to generation of high laser power, its advantages would be wasted if the optical resonator of the laser oscillator could not support optical TEM large enough to fill the AMA aperture;
2. To obtain good BQ, it is necessary to design a resonator having good discrimination against higher order TEM;
3. Large transverse dimensions of the AMA aperture restrict the designer to a relatively low laser gain per AMA module, which exacerbates the problem of extracting available laser power from the AMA gain medium;
4. Low laser gain may also limit the resonator outcoupling fraction which, in turn, may lead to a reduced laser beam intensity in the far field;
5. While using an array of AMA modules for successive amplification of the beam enables the desired laser gain to be obtained, this requires a resonator capable of producing large TEM size over a long propagation path;
6. Using multiple AMA modules in a laser oscillator increases alignment sensitivity, which, in turn affects stability of oscillating TEM. Some alignment issues may be alleviated by using a stable and rigid alignment platform (optical bench), however; such a platform often represents a constraint to device integration into a compact, lightweight package.
7. During the startup, the AMA gain medium experiences a rise in temperature until temperature gradients for steady-state operation are developed. This situation further aggravates mode and alignment stability.

It should be noted that such problems are far less severe in the thin disk laser of the prior art, which employs a very small aperture gain element and generates modest average power with modest BQ. This permitted using the thin disk laser gain medium in a laser oscillator with a stable optical resonator. Using such a stable resonator is entirely inappropriate for use with a large aperture AMA gain medium.

Unstable Resonators

One challenge associated with lasers employing a gain medium with a large optical aperture is designing a resonator supporting a low order (preferably $TEM_{oo}$) mode(s) that can efficiently fill the entire aperture. Forty years of laser development has shown that obtaining high-average power output with good BQ from a solid-state laser with conventional stable resonators poses almost insurmountable problems. Such a stable laser resonator would require a cavity length that is either impracticably large, or would use an expansion telescope, or would have to be made in a folded configuration that increases the number of mirrors required. Stable resonators with long cavity or telescopic beam expanders are also very sensitive to mirror alignment and impractical for integration onto mobile platforms. For these reasons, laser oscillators for HAP are generally practiced with an unstable resonator, which have shown high efficiency for extracting available power associated with the cavity mode in a near diffraction-limited beam. Such a near diffraction limited beam provides a near optimum distribution of radiant energy in the far field as is required for many important applications. Unstable resonators are often practiced in a confocal configuration with either a positive or negative branch variants. For additional information, see for example, A. Siegman, "*Lasers*", John Willey and Sons, New York, N.Y., 1985.

Ring Unstable Resonators

Ring unstable resonators (introduced by Buczek et al. in U.S. Pat. No. 3,824,487), in contrast to linear unstable resonators, provide much increased design flexibility and a number of design possibilities over and above the advan tages possessed by ring resonators for laser applications generally. A ring unstable resonator can be designed, for example, to have a short telescopic magnification (i.e., beam expansion) section using conveniently available optical elements with short radii of curvature, and then to have much longer collimated regions through the laser gain medium. Negative-branch ring resonators can also be built with spatial filters, which can cleanup the mode patterns and filter out some of the phase distortion effects caused by inhomogeneous elements in the resonator. Ring resonators also offer the possibility of unidirectional oscillation (traveling wave), which eliminates spatial hole burning effects found in linear resonators and which results from interference between counter-propagating optical waves. Ring resonators are often designed using various sorts of folded sections in order to achieve near normal incidence on at least some of the mirrors, since this minimizes astigmatism from curved mirrors and permits standard coatings to be used. It is also possible to design a negative-branch ring unstable resonator such that each round trip corresponds to an image relay which images a magnified version of the coupling aperture back onto itself each round trip. Such a self-imaging configuration is known to yield a particularly smooth and uniform lowest order mode pattern in an unstable resonator. For additional information see, for example, the above noted publication by Siegman, or N. Hodgson and H. Weber, "*Optical Resonators*", Springer-Verlag, London, 1997.

Adaptive Optics

AMA modules disclosed by the applicant in the above noted U.S. patent applications provide a laser gain medium with very high homogeneity over a large aperture and under operational conditions. However, when a large number of AMA modules are used to construct a laser oscillator, even small residual inhomogenieties experienced by an optical wave recirculating inside a resonator may add up to significantly perturb the optical phase front. Furthermore, in all operational unstable resonator devices, there are various naturally occurring sources of phase and amplitude distortions that degrade both the intracavity mode and the resultant far-field irradiance structure. One effective approach to addressing this problem is to use an intracavity adaptive optic element(s) to drive the aberrated mode structure back towards the ideal unaberrated mode of the resonator. The term "aberrations" as used herein refers to distortions of the optical wavefront from flat or simple curvature conditions.

A conventional adaptive optics system generally includes a deformable mirror whose surface can be deformed selectively by means of actuators. Suitable deformable mirrors have been disclosed in the prior art. See, for example, J. E. Pearson and R. H. Freeman, in Applied Optics, vol. 21, page 4 (1982). The deformation of the mirror is typically within the range of several wavelengths of the impinging laser light. As the incoming aberrated light strikes the deformable mirror, it is reflected from the mirror such that the mirror compensates, at least partially, for the aberrations. The reflected light impinges upon a beam splitter or a sampler that directs a small fraction of the laser beam to a wavefront sensor. The sampled signals are transmitted to a controller, which drives the actuators of the deformable mirror, in a feedback loop, in response to the sampled signals. This compensates for the aberrations in the light wave. Such a system for intracavity wavefront correction was first disclosed by Frieberg in U.S. Pat. No. 4,249,140 (1981).

However, the wavefront can also be tilted and will thus move in the wrong direction. In many adaptive optics systems it would not be desirable to compensate for tilt using a deformable mirror, since the magnitude of the tilt might be much greater than the range of the deformable mirror, and consequently, the tilt would not be removable. For this reason, modern adaptive optics systems also employ a steering mirror for continuous compensation of tilt in the wavefront direction. A deformable mirror and a steering mirror may each have their own sensor or use a common sensor. The actions of the two components are separated by removing any tilt portion from the wavefront measurement used to drive the deformable mirror and using it to drive the steering mirror. An example of an adaptive optics system employing both a steering mirror and a deformable mirror was disclosed by Salmon in U.S. Pat. No. 5,745,309 (1998). For additional pertinent information on adaptive optics, see for example Chapter 3, Intracavity Laser Beam Control and Formation in "*Laser Resonators: Novel Designs and Development,*" by A. Kudryashov and H. Weber, SPIE Optical Engineering Press, Bellingham, Wash. (1999) or R. K. Tyson, "*Principles of Adaptive Optics,*" Academic Press, San Diego, Calif. (1998).

SUMMARY OF THE INVENTION

A principal object of the present invention is to provide a SSL oscillator with a large-aperture gain medium in an AMA configuration capable of producing high-average power output with good BQ. In particular, the present invention meets a number of significant needs including, but not limited to, the following:

A resonator supporting large size, low-order laser TEM;
A resonator with efficient mode discrimination against higher order TEM;
A high resonator outcoupling for good BQ;
A collimated intracavity beam;
A means to prevent spatial hole burning;
Intracavity laser TEM control by adaptive optics;
A means for optical wavelength tuning;
An axisymmetric arrangement of AMA modules for compact integration;
An axisymmetric optical bench for stable and compact alignment platform;
An alignment control and beam jitter rejection by steering mirror;
Kinetic mounting of AMA modules; and
A pressure balanced means for connecting coolant lines to AMA modules.

A first preferred embodiment of the present invention comprises a SSL with an array of AMA modules placed in a linear unstable resonator that provides a large fundamental mode size, excellent transverse mode control, and collimated output beam. A second preferred embodiment of the present invention comprises a SSL with an array of AMA modules placed in a ring unstable resonator that provides much increased design flexibility and an increased number of design possibilities, longer collimated beam regions, and which avoids spatial hole burning. A third preferred embodiment of the present invention provides additional improvements in laser power extraction from an AMA laser gain medium. The fourth and fifth preferred embodiments of the present invention provide axisymmetric arrangement of AMA modules for compact packaging. A sixth alternative preferred embodiment of the present invention provides AMA modules with an axisymmetric arrangement of gain elements for improved packaging and integration. Means for kinematically mounting AMA modules and supplying them with coolant by pressure balanced means are also disclosed.

BRIEF DESCRIPTION OF THE DRAWINGS

The present invention will become more fully understood from the detailed description and the accompanying drawings, wherein:

FIG. 1 shows a side view of a solid-state laser gain medium in an active mirror configuration disclosed in the prior art;

FIG. 2a shows an AMA configuration for high-average power disclosed in the prior art;

FIG. 2a shows another AMA for high-average power disclosed in the prior art;

DETAILED DESCRIPTION OF THE PREFERRED EMBODIMENTS DEFINITIONS

"Active mirror amplifier (AMA) module" refers to an assembly including at least one laser gain medium in the active mirror (amplifier) configuration (such as, for example, shown in FIG. 1), means to cool the laser gain medium, means to support the laser gain medium, and means to provide optical pump radiation into the laser gain medium. A suitable AMA module may be provided in accordance with the already noted applicant's pending application Ser. Nos. 09/505,399, 09/767,202 and 09/782,788.

"Laser gain assembly" refers to a plurality of AMA modules arranged in an array so that a laser beam may be received, amplified and reflected successively by each module.

"Optical aperture" is defined as: "the diameter of the objective of a telescope or other optical instrument" (McGraw-Hill Dictionary of Scientific and Technical Terms, 4th edition, published by McGraw-Hill, Inc., ISBN 0-07-045270-9).

"AMA optical aperture" refers to the maximum transverse dimension of a laser beam, which can be received, amplified, and transmitted by an AMA module.

"Adaptive optics system" refers to a system for continuous (at least partial) correction of aberrated phase front of optical waves. Such a system includes a means for sampling a laser beam, a sensor for sensing an optical wavefront of the sampled laser beam and/or a sensor for sensing intensity distribution of the sampled laser beam, a steering mirror and/or a deformable mirror, and a controller which correlates the input electrical signals from the sensors into corresponding control signals for deforming the actuators of the steering mirror and/or deformable mirror to obtain the desired closed loop bandwidth. A sensor for intensity distribution may incorporate a focal plane array or a sensor measuring a total power in a specified optical aperture, or other suitable means for sensing total power in the optical aperture.

"Transverse electromagnetic mode (TEM)" refers to an optical mode in which a particular transverse electromagnetic wave is propagated inside an optical resonator or in a light beam. The electric field of this wave can assume many different cross-sectional shapes, "termed" transverse electromagnetic modes" (TEM).

DESCRIPTION OF THE FIRST PREFERRED EMBODIMENT

Figure 3:
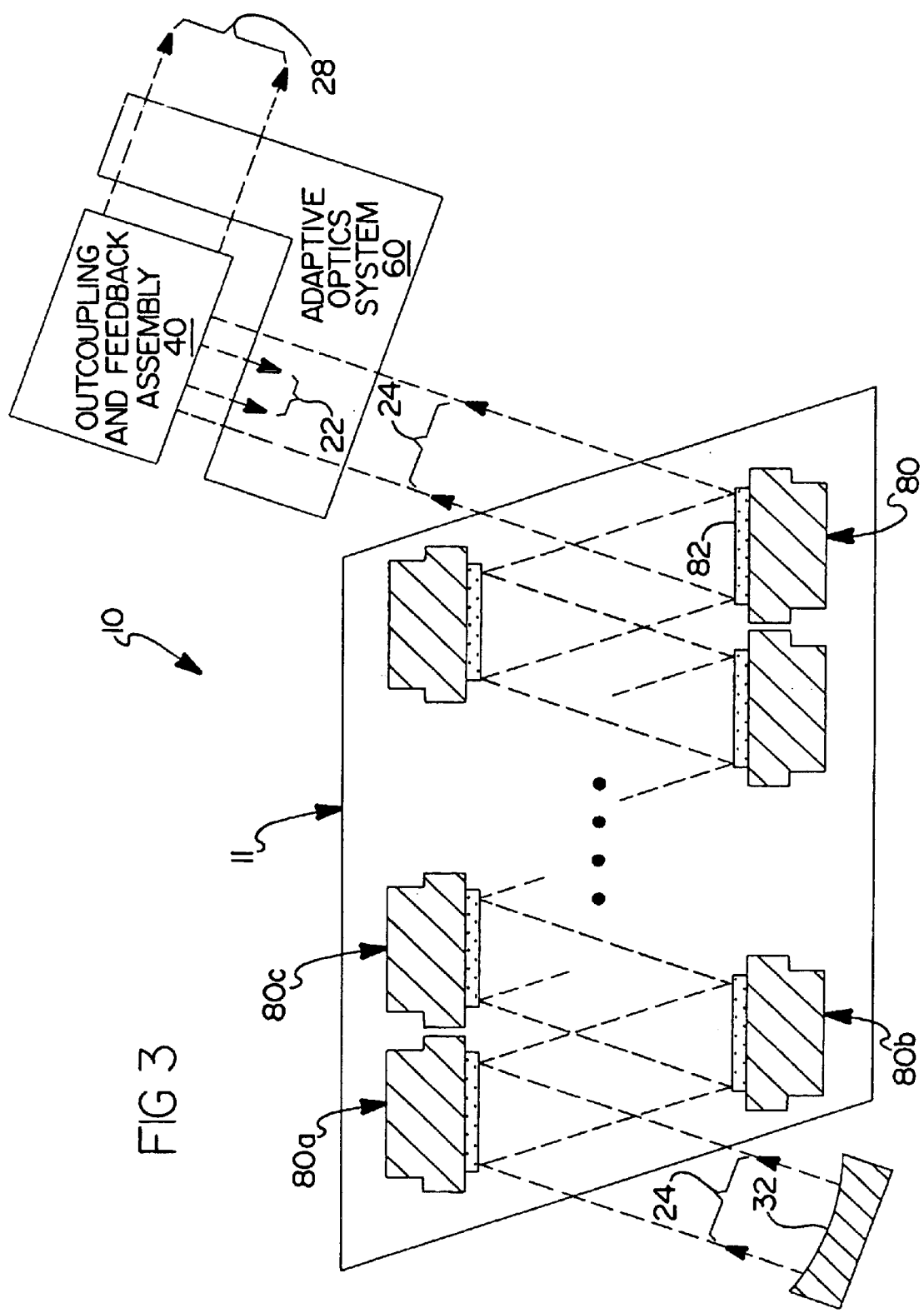
FIG. 3 shows a schematic diagram of a first preferred embodiment of the present invention.

Referring to FIG. 3, there is shown a solid-state laser oscillator 10 in accordance with a first preferred embodiment of the present invention. The SSL oscillator 10 comprises a laser gain assembly 11 placed in a linear (as opposed to ring) unstable resonator formed by end mirror 32 and the outcoupling and feedback assembly 40. The laser gain assembly 11 further comprises a plurality of AMA modules 80, with each such module containing a laser gain medium 82 in an AMA configuration. AMA modules 80 are positioned within the laser gain assembly 11 so that a laser beam may successively propagate from module to module by undergoing successive amplification and reflection therein. For example, a laser beam 24 received from end mirror 32 by AMA module 80a is amplified and reflected onto AMA module 80b, where it is received, amplified, and reflected onto AMA module 80c, and so on, until the amplified laser beam 24 exits the laser gain assembly 11. Similarly, feedback laser beam 22 (originating from the outcoupling and feedback assembly 40) and propagating in an opposite direction to laser beam 24, is amplified and reflected by AMA modules 80 until it reaches the end mirror 32. At the end mirror 32 it is reflected, thus forming a laser beam 24.

The laser gain medium 82 of each module 80 preferably has flat surfaces and therefore has no magnifying power with respect to the laser beam 24. Preferably, the number of AMA modules 80 within the laser gain assembly 11 is such that the combined laser gain produced by the modules is sufficient to permit outcoupling a large portion of the laser power circulating in the resonator while extracting a large portion of available laser power from the laser gain media 82. A portion of the laser beam 24 entering the outcoupling and feedback assembly 40 is coupled out of the oscillator 10 forming an outcoupled laser beam 28. A portion of the laser beam 28 not coupled out of the oscillator 10 is reflected back into the resonator as the feedback beam 22.

The preferred number of AMA modules may vary significantly for different designs of the SSL oscillator 10. This is because much depends on the material choice, dimensions, and operating conditions of the gain medium 82. However, in most applications the number of modules will preferably range from 5 to 100.

Figure 4:
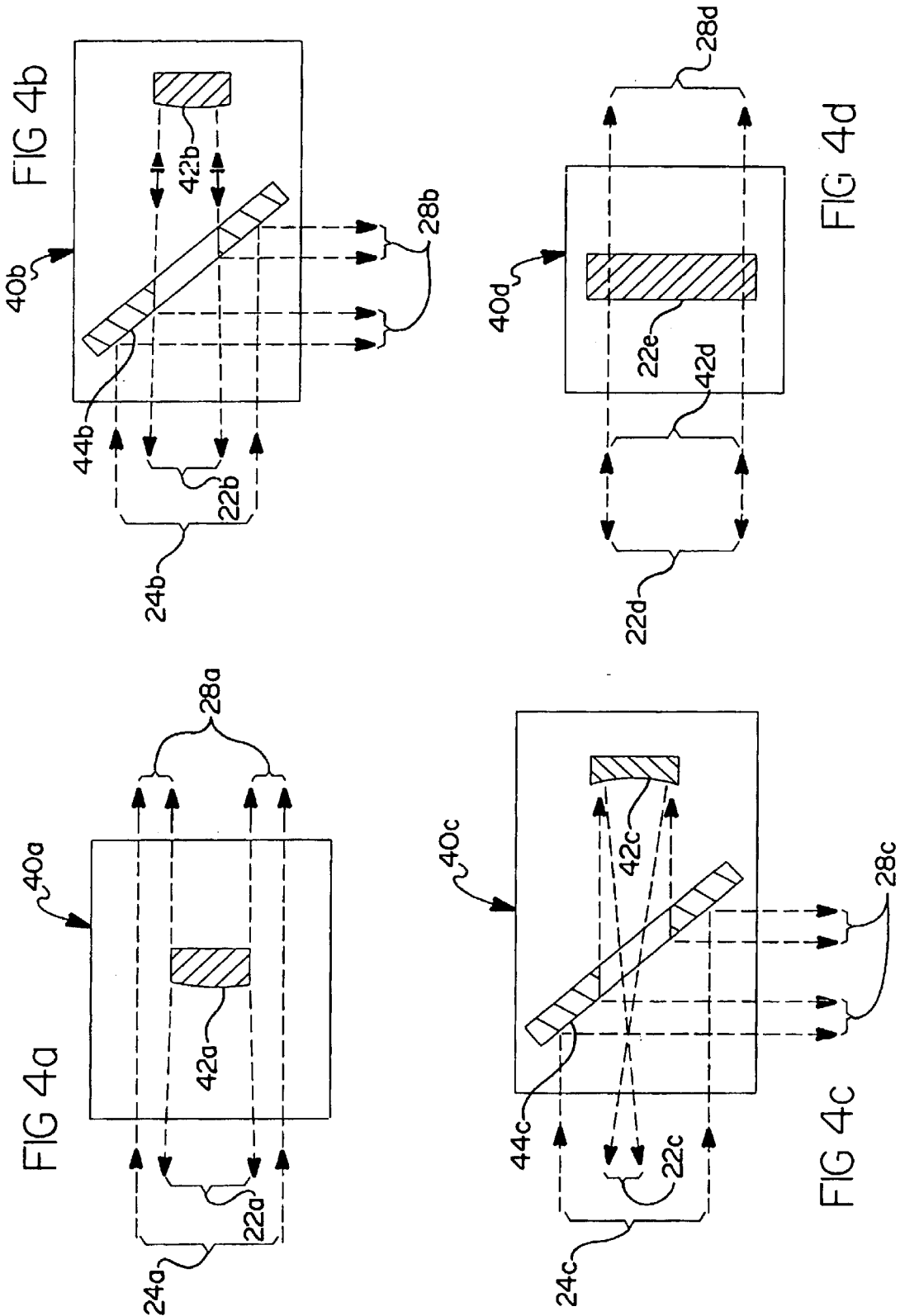
FIG. 4a shows a first preferred variant of the outcoupling and feedback assembly for use with the first preferred embodiment of the present invention.
FIG. 4b shows a second preferred variant of the outcoupling and feedback assembly for use with the first preferred embodiment of the present invention.
FIG. 4c shows a third preferred variant of the outcoupling and feedback assembly for use with the first preferred embodiment of the present invention.
FIG. 4d shows a fourth preferred variant of the outcoupling and feedback assembly for use with the first preferred embodiment of the present invention.

The outcoupling and feedback assembly 40 is configured so that together with the end mirror 32 it forms a linear unstable optical resonator. A variety of suitable configurations of the outcoupling and feedback assembly 40 which can be employed in the SSL oscillator 10 have been disclosed in the prior art. The preferred configurations of the outcoupling and feedback assembly 40 are shown in FIGS. 4a, 4b, 4c, and 4d. FIG. 4a shows a feedback system 40a wherein a convex feedback mirror 42a is placed in the laser beam 24a propagating from the gain assembly 11. A portion of the laser beam 24a impinging onto feedback mirror 42a is reflected back into the laser gain assembly 11 and onto the end mirror 32 (FIG. 3) as a feedback beam 22a. Part of the beam 24a not reflected by the feedback mirror 42a is hereby coupled out of the resonator as an outcoupled beam 28a. Preferably, curvatures for the end mirror 32 and feedback mirror 42 are chosen to form a confocal resonator configuration in which mirrors 32 and 42a together act like a telescope, and which automatically produces a collimated output beam 28a. With the feedback mirror 42a having a convex reflecting surface, the feedback beam 22a expands until it reaches the end mirror 32, which then returns a collimated beam 24 to the outcoupling and feedback system 40a. An unstable resonator of this type is usually referred to as a "positive branch." One advantage of this configuration is that during the return path from the end mirror 32 (FIG. 3), laser beam 24 maintains constant size, which permits using AMA modules 80 having the same optical aperture.

FIG. 4b shows a feedback system 40b, which is generally same as feedback system 40a shown in FIG. 4a except that a scraper-type outcoupling mirror 44b is placed in the front of the convex feedback mirror 42b. FIG. 4c shows a feedback system 40c which is generally the same as feedback system 40b shown in FIG. 4b except that the feedback mirror 42c now has a concave reflecting surface. Feedback beam 22c reflected by feedback mirror 42c is first focused before expanding on its path to the end mirror 32. With the resonator in a confocal configuration, the end mirror 32 (FIG. 3) then returns a collimated beam 24c to the outcoupling and feedback system 40c. This type of unstable resonator is usually referred to as a "negative branch."

FIG. 4d shows a feedback system 40d employing a feedback mirror 42d having a coating with variable reflectivity across the optical aperture. The profile of such a coating generally exhibits a maximum reflectivity at the center. A variety of reflectivity profiles (for example Gaussian, super-Gaussian, and parabolic) are known in the art which may be suitable for use with the feedback mirror 42d profiles. See, for example, the above noted publication by N. Hodgson et al. The front surface of the feedback mirror 42d (facing mirror 32) may be flat, concave or convex.

AMA modules disclosed by the applicant in the above-noted pending U.S. patent applications provide a laser gain medium with very high homogeniety over a large aperture and at operational conditions. However, when a large number of AMA modules are used, small residual inhomogenieties experienced by an optical wave recirculating inside a resonator may add up to significantly perturb the optical phase front. Furthermore, in all operational unstable resonator devices there are various naturally occurring sources of phase and amplitude distortions that degrade both the intracavity mode and the resultant far-field irradiance structure. To correct this problem, the solid-state laser oscillator 10 (shown in FIG. 3) may employ an adaptive optics system 60 placed inside the resonator to perform phase front correction.

Figures 5, 6:
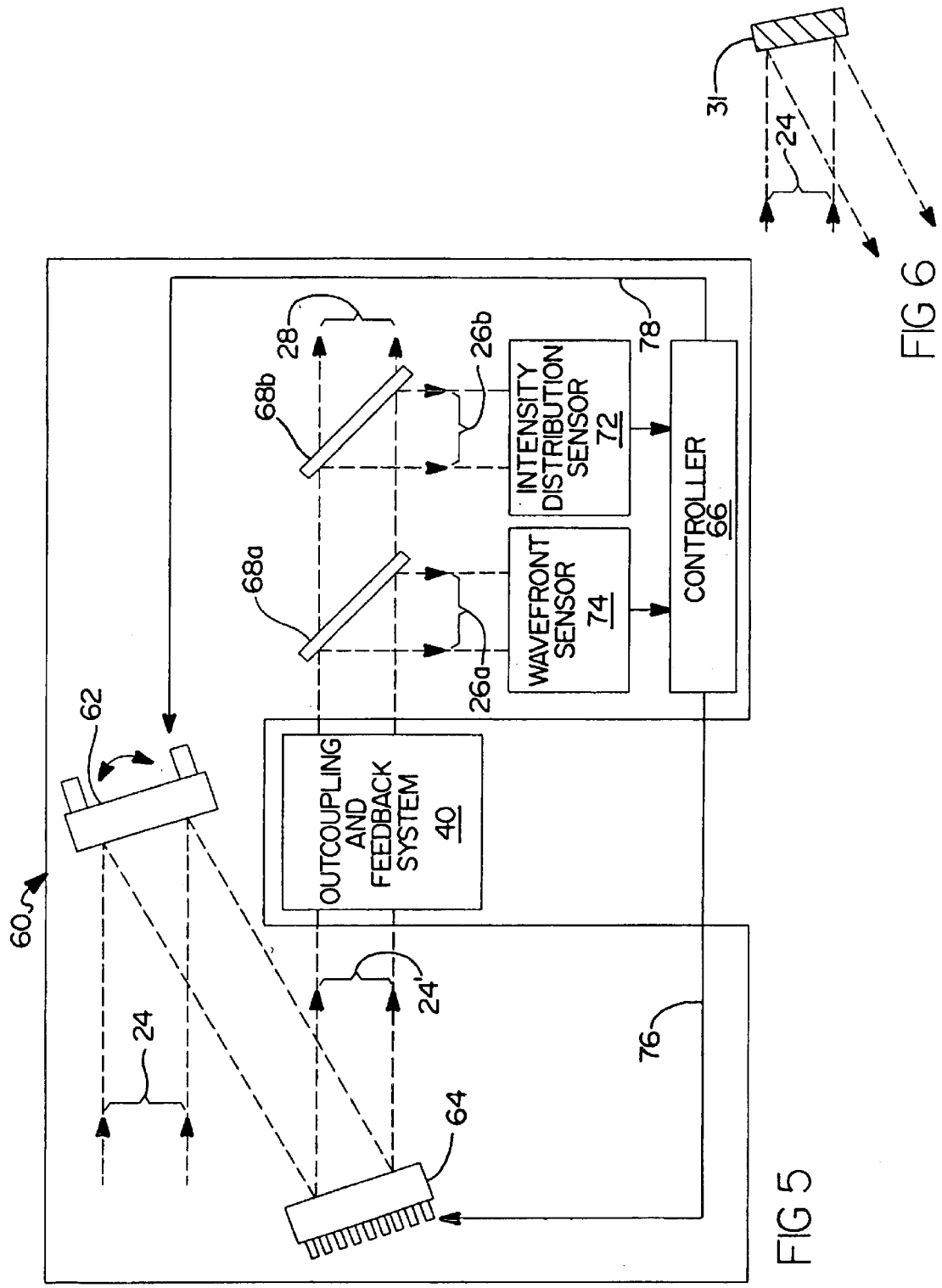
FIG. 5 shows a schematic diagram of a preferred adaptive optics system for use with the present invention.
FIG. 6 shows a schematic diagram of wavelength selection by diffraction grating for use with the present invention.

Referring now to FIG. 5 there is illustrated a preferred embodiment of an adaptive optics system 60 suitable for use with the oscillator 10 of the present invention. The adaptive optics system 60 generally includes a steering mirror 62 which steers the incoming, aberated laser beam 24 so as to impinge a deformable mirror 64. The deformable mirror 64 has its surface deformed selectively by means of a plurality of actuators. When the aberrated laser beam 24 strikes the deformable mirror 64 it is reflected from it, such that the mirror 64 compensates (i.e., removes), at least partially, for the existing aberrations. The reflected laser beam 24' is directed to the outcoupling and feedback assembly 40 which produces an outcoupled beam 28. Outcoupled beam 28 is directed through beam splitters 68a and 68b which reflect low power sample beams 26a and 26b, respectively, onto a wavefront sensor 74 and intensity distribution sensor 72. The wavefront sensor 74 samples the sample beam 26a and converts the sampled light into corresponding electrical signals which are sent out to controller 66. A wavefront reference source laser (not shown) providing a to beam with a flat wavefront to calibrate a wavefront sensor 74 may also be included in the adaptive optics system 60 as disclosed in the prior art, for example, by the already noted publication by Salmon. In a similar fashion, the intensity distribution sensor 72 samples the sample beam 26b and converts the sampled light into corresponding electrical signals which are sent out to controller 66. In response to the sampled signals, controller 66 drives the actuators of the steering mirror 62 via feedback loop 78, and the actuators of the deformable mirror 64, via feedback loops 76, to thereby compensate for the aberrations in the laser beam wavefront. The controller 66 provides control signals for the actuators of the steering mirror 62 and the deformable mirror 64 with sufficient speed to obtain the required closed loop bandwidth. The adaptive optics system 60 may also be practiced in variations of the preferred embodiment which may either omit the beam splitter 68a and wavefront sensor 74, or omit the beam splitter 68b and the intensity distribution sensor 72. Other variants of the adaptive optics system 60 may omit either the steering mirror 62 or the deformable mirror 64.

An advantage of using the adaptive optics system 60 with the present invention is that a high-average power, near diffraction limited output beam is obtained from the laser oscillator 10 in spite of various anomalies such as changing environmental conditions, temporarily varying misalignment, optical surface distortions, and temporarily varying gain medium properties. Additionally, the ability to actively compensate for optical wavefront distortions inside the resonator enhances mode discrimination of the resonator, which is essential for providing an output beam 28 with good BQ.

The solid-state laser oscillator 10 may be also practiced with laser gain medium 82 capable of lasing in continuous spectrum or at closely spaced lines. Examples of such solid-state laser gain media with continuous tunability include Tm:YAG and Ti:Sapphire. $Nd^{3+}$ is an example of a lasant ion having multiple lasing lines, some of which are closely spaced. The prior art has established that laser oscillators with a gain medium having broad tunability or multiple lasing lines can be made to laser only at specific predetermined wavelengths by placing a diffraction grating or a refracting prism into the laser resonator. FIG. 6 shows a reflective diffraction grating 39 receiving a laser beam 24 and oriented in such a manner so as to reflect a portion of laser beam 24 having a selected wavelength in a predetermined direction. The collimated laser beam 24 is diffracted by the grating lines to obtain frequency narrowing of the radiation bandwidth. The reflective diffraction grating 31 typically has a large number of grating lines per millimeter, typically 500 or more, to provide adequate narrowing of the broadband gain profile. The large size of the resonator TEM is well suited for precise wavelength selection.

Figure 7:
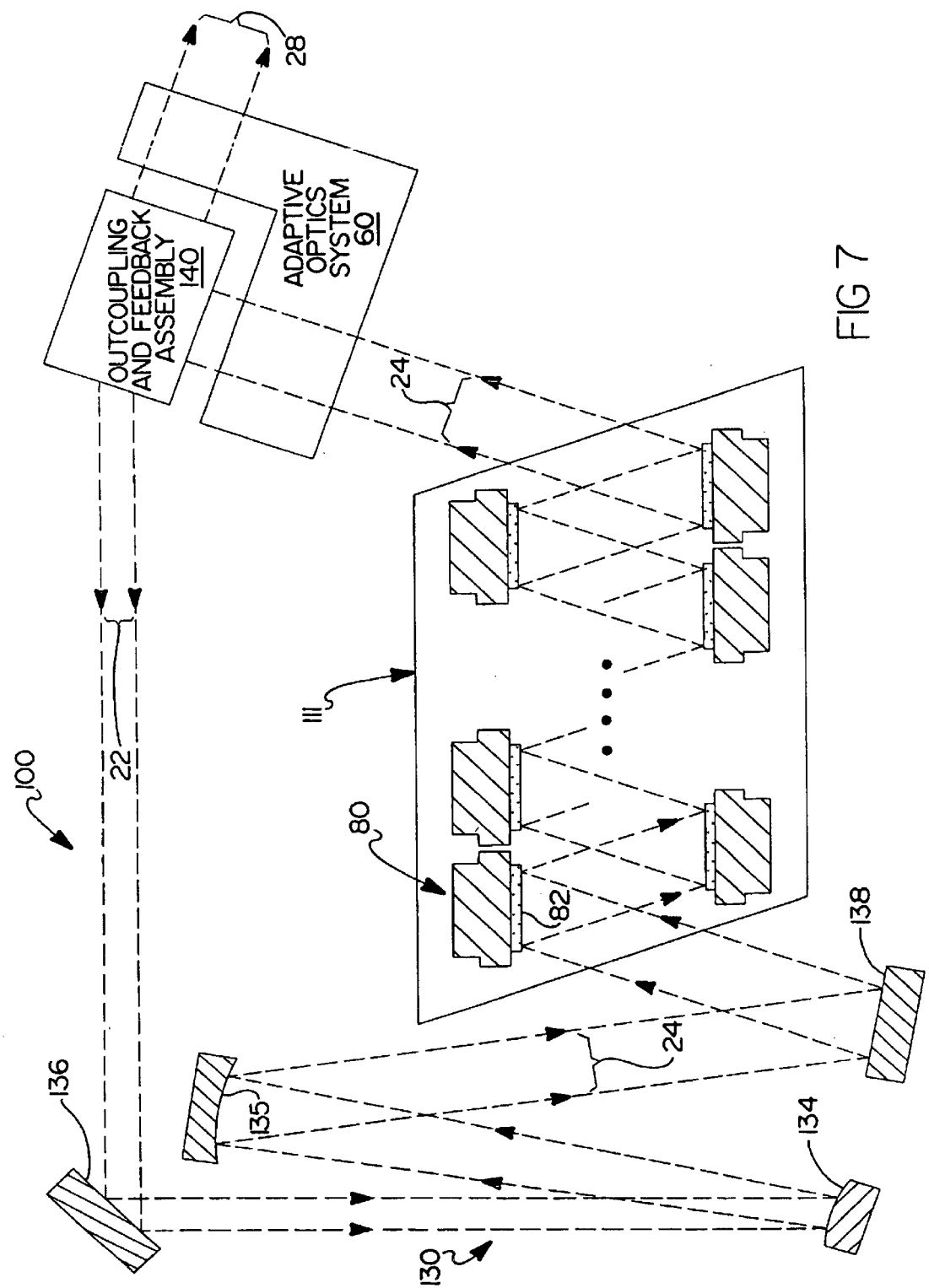
FIG. 7 shows a schematic diagram of a second preferred embodiment of the present invention.

Referring now to FIG. 7, there is shown a solid-state laser oscillator 100 in accordance with a second alternative preferred embodiment of the present invention. The SSL oscillator 100 comprises a laser gain assembly 111 placed in a ring unstable resonator formed by mirrors 134, 135, 136, 138, and outcoupling/feedback assembly 140. The laser gain assembly 111 is generally the same as that used with the first embodiment of the present invention shown in FIG. 3.

A portion of the collimated laser beam 24 propagating from laser gain assembly 111 and entering the outcoupling and feedback assembly 140 is coupled out of the oscillator 100 forming an outcoupled laser beam 28. A portion of the laser beam 28 not coupled out of the oscillator 100 forms a feedback beam 22, which is directed by successive reflections from mirrors 136, 134, 135, and 138 back into the laser gain assembly 111. Mirrors 136 and 138 are preferably flat. Mirrors 134 and 135 are convex and concave, respectively. Their curvatures are chosen so as to form a beam expander 130 which receives a collimated feedback beam 22 of smaller transverse dimensions and which produces a collimated beam 24 with larger transverse dimensions suitable for use with the laser gain assembly 111.

The unstable ring resonator used with the SSL oscillator 100 provides a large fundamental mode size, excellent transverse mode control, and a collimated output beam 28. The perimeter of the resonator is independent of the radii of curvature of the mirrors 134 and 135. Consequently, mirrors 134 and 135 can be fabricated with smaller and easier to manufacture radii of curvature and the beam expander 130 is easier to align. In addition, the resonator is relatively insensitive to optical misalignment and mirror distortion. This is of particular importance for laser gain assemblies 111 having a long optical path therethrough, such as when employing a large number of AMA modules 80 and/or when employing successive AMA modules that have significant physical separation therebetween. Furthermore, the resonator can provide a magnification factor significantly greater than unity, which encourages unidirectional oscillation within the oscillator and provides a large fraction of power in the central lobe of the far-field pattern. Additionally, an output coupler can be located at any location on the resonator perimeter downstream of laser gain assembly 111 where laser beam 24 is collimated.

Figure 8:
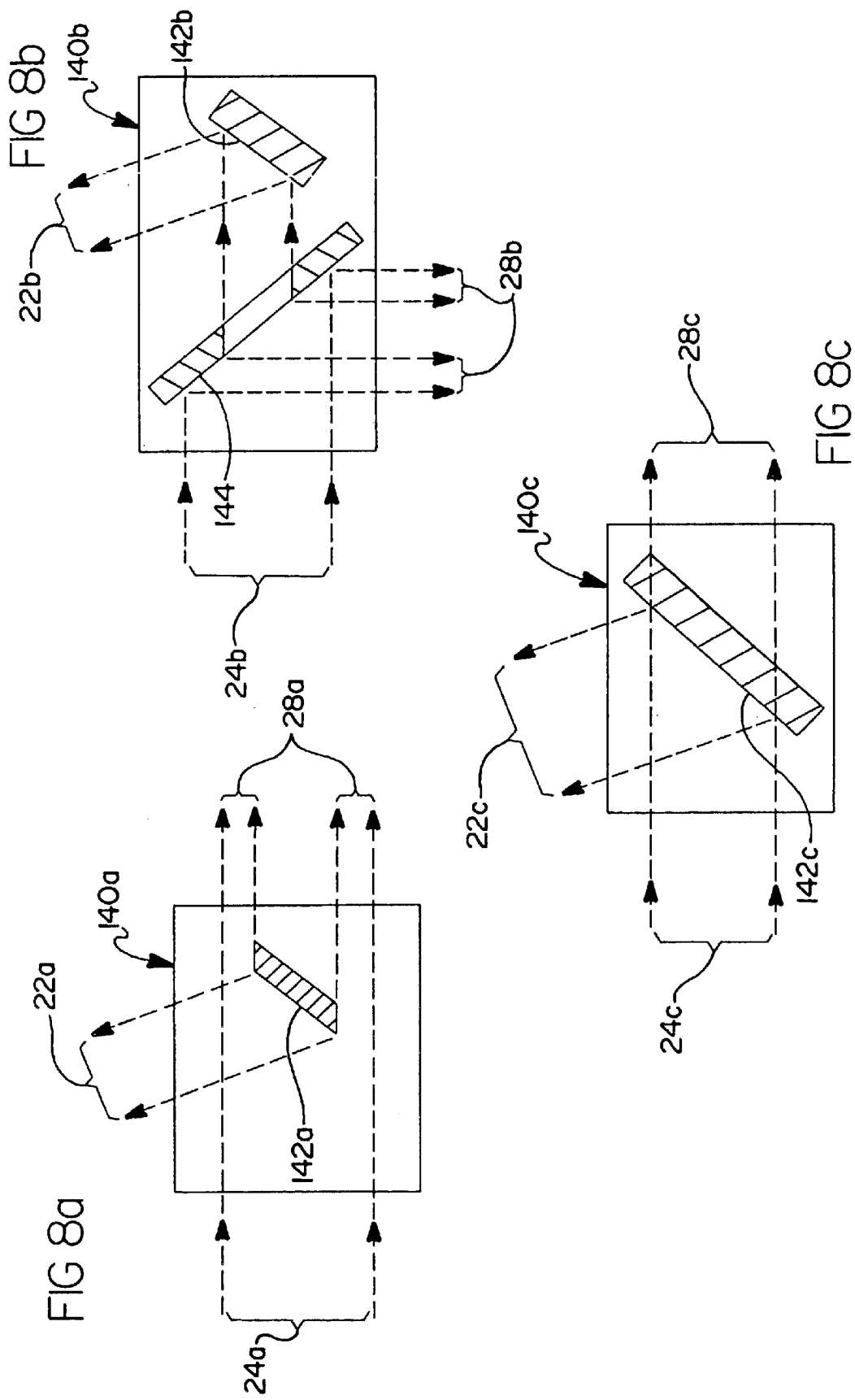
FIG. 8a shows a first preferred variant of the outcoupling and feedback assembly for use with the second preferred embodiment of the present invention.
FIG. 8b shows a second preferred variant of the outcoupling and feedback assembly for use with the second preferred embodiment of the present invention.
FIG. 8c shows a third preferred variant of the outcoupling and feedback assembly for use with the second preferred embodiment of the present invention.

Several suitable configurations of the outcoupling and feedback system 140 which can be employed in the SSL oscillator 100 are shown in FIGS. 8a, 8b, and 8c. FIG. 8a shows a feedback system 140a wherein a flat feedback mirror 142a is placed in the laser beam 24a propagating from the laser gain assembly 111 and at an angle with respect to its direction of propagation. A portion of the laser beam 24a impinging onto feedback mirror 142a is reflected to the side as a feedback beam 22a for injection into the laser gain system 111 (FIG. 7). Part of the beam 24a not reflected by the feedback mirror 142a is coupled out of the resonator as an outcoupled beam 28a.

With the feedback mirror 142a of FIG. 8a having a flat reflecting surface, the feedback beam 22a is collimated until it reaches beam expander 130 of the SSL oscillator 100 of FIG. 7. It then expands into a collimated beam 24 for injection into laser gain assembly 111. A ring unstable resonator employing this type of beam expander is usually referred to as a "positive branch." One advantage of this configuration is that during the return path, laser beam 24 maintains constant size, which permits using AMA modules 80 having the same optical aperture.

FIG. 8b shows a feedback system 140b which is generally the same as feedback system 140a shown in FIG. 8a except that a scraper-type outcoupling mirror 144b is placed in the front of the feedback mirror 142b. FIG. 8c shows a feedback system 140c employing a feedback mirror 142c having a coating with variable reflectivity across the optical aperture. The profile of such a coating generally exhibits a maximum reflectivity at the center. A variety of other suitable reflectivity profiles are known in the art which may be suitable for use with the feedback mirror 142c, namely, Gaussian, super-Gaussian, and parabolic. See for example, the above noted publication by N. Hodgson et al.

Figure 9:
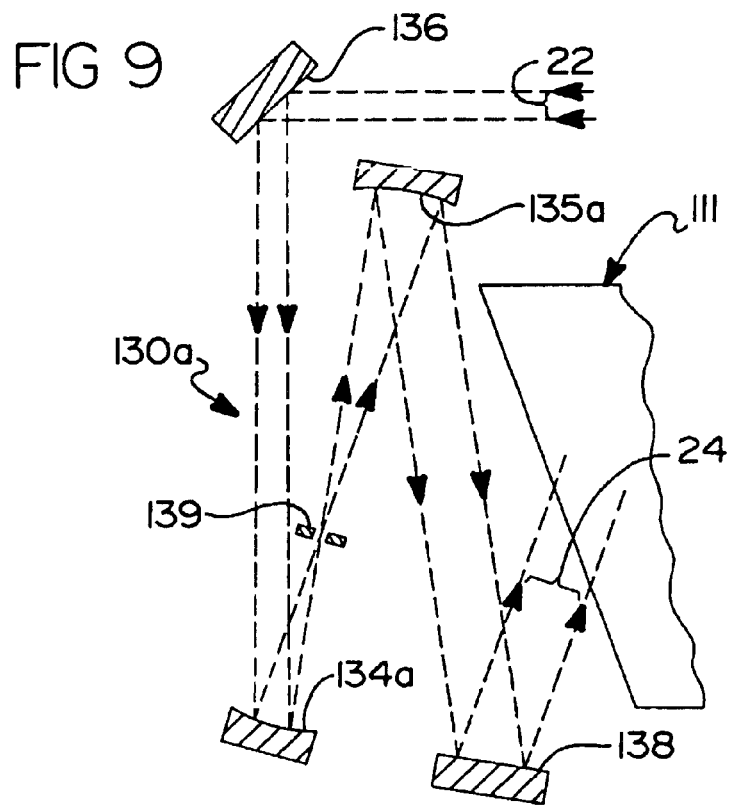
FIG. 9 shows a schematic diagram of an alternate beam expander for use with the present invention.

A variation of the second embodiment of the present invention may use an alternate configuration of the beam expansion telescope. FIG. 9 shows a telescope beam expansion telescope 130a formed by mirrors 134a and 135a, both having concave surfaces. Mirrors 134a and 135a are suitable for receiving the collimated feedback beam 22 and expanding it into the collimated beam 24 with transverse dimensions suitable to fill the optical aperture in AMA modules 80 of the laser gain assembly 111. A ring unstable resonator employing this type of beam expander is usually referred to as a "negative branch." One advantage of this configuration is that a filtering aperture 139 may be placed at the laser beam focus between mirrors 134a and 135b for the purpose of removing undesirable higher order TEM. Such an aperture may also be beneficial for suppressing an optical wave traveling around the ring resonator in the reverse (i.e., clockwise) direction. Other advantages include using mirrors having a shorter radius of curvature with the concomitant advantages of ease of construction and alignment. However, for very high-power lasers, such an internal focus may cause a breakdown of the medium at the point where the focus occurs, thereby resulting in non-linear optic effects within the cavity. It is also possible to design a negative-branch ring unstable resonator such that each round trip corresponds to an image relay which images a magnified version of the coupling aperture back onto itself each round trip. Such a self-imaging configuration is known to yield a particularly smooth and uniform lowest order mode pattern in an unstable resonator.

SSL oscillator 100 shown in FIG. 7 may also employ an adaptive optics system 60 to further improve the optical quality of the output laser beam. Adaptive optics system 60 was previously described in conjunction with the first embodiment of the present invention and schematically shown in FIG. 5.

Figure 10:
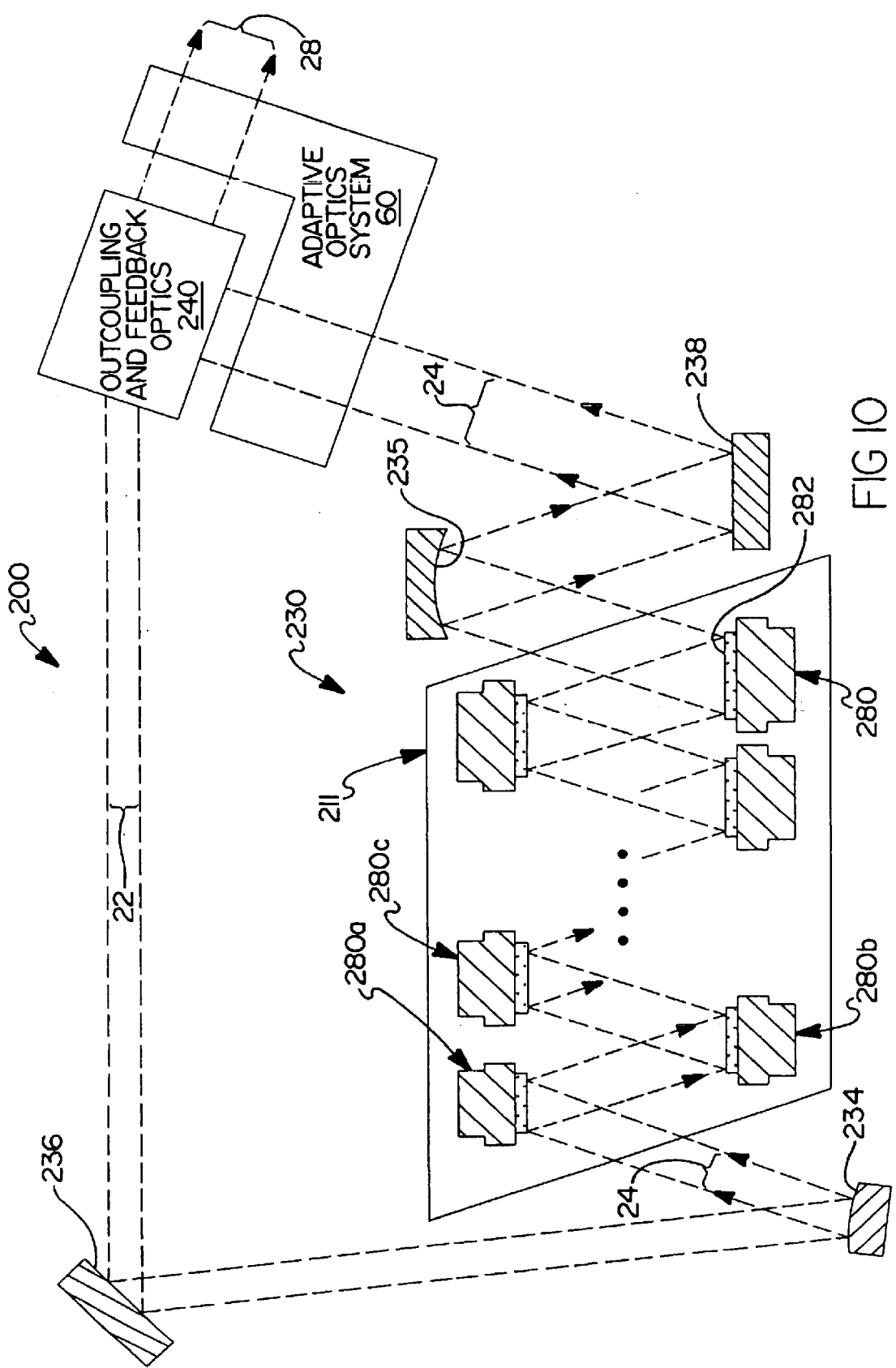
FIG. 10 shows a schematic diagram of a third preferred embodiment of the present invention.

Referring now to FIG. 10, there is shown a solid-state laser oscillator 200 in accordance with a third alternative preferred embodiment of the present invention. The SSL oscillator 200 is similar to the SSL oscillator 100 shown in FIG. 7 except that the laser gain assembly 211 is placed inside the beam expansion telescope 230 formed by mirrors 234 and 235. The laser gain assembly 211 employs AMA modules 280 having an increasing size of optical aperture to match the size of the expanding laser beam 24. For example, AMA module 280a receiving feedback beam 22 from mirror 234 has the smallest optical aperture. AMA module 280b receiving a laser beam from AMA module 280a has a somewhat larger optical aperture than module 80a to match in size the increased transverse dimension of the expanding laser beam. Similarly, AMA module 280c receiving a laser beam from AMA module 280b has an appropriately larger optical aperture, and so on. The key advantage of oscillator 200 is that the intensity (power per unit of area) of the laser beam incident onto all of the AMA modules 280 is generally constant as the beam expands in size and power. This means that the efficiency of extracting laser power from the gain medium is generally the same for all of the AMA modules 280 in the laser gain assembly 211. This is a significant improvement over the second embodiment of the invention shown in FIG. 7, where the intensity of the laser beam increases as it travels through laser gain assembly 211, which results in lower extraction efficiency for upstream AMA modules and higher extraction efficiency for downstream AMA modules.

Figure 11:
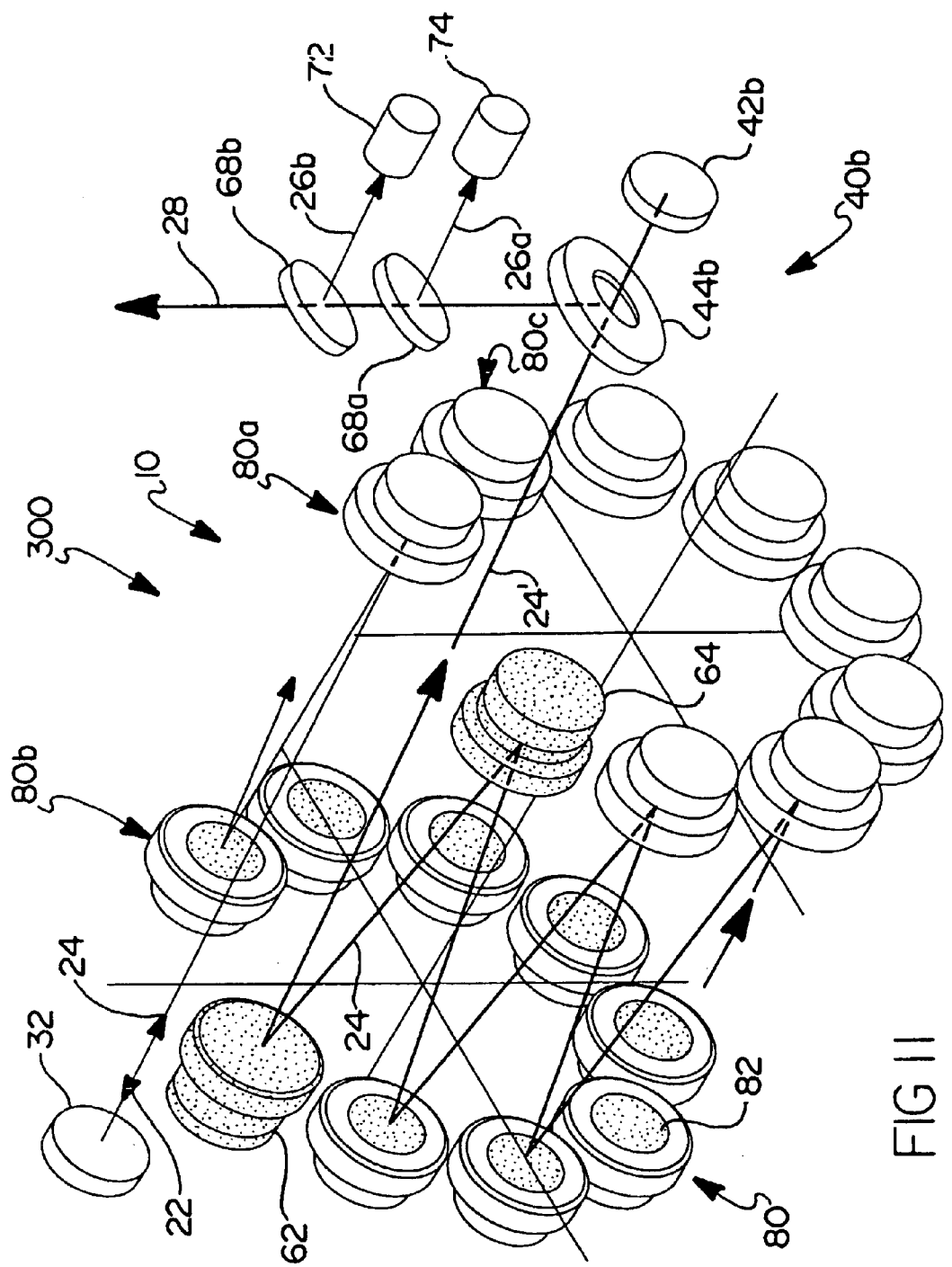
FIG. 11 shows an isometric drawing of a fourth preferred embodiment of the present invention using a linear unstable resonator.

Referring now to FIG. 11, there is shown a solid-state laser oscillator 300 in accordance with a fourth alternative preferred embodiment of the present invention. The SSL oscillator 300 is similar to the SSL oscillator 10 shown in FIG. 3 except that the AMA modules 80 are arranged into two axisymmetric, coaxial arrays facing each other. Beam steering mirror 62 and deformable mirror 64 (if used) can also be incorporated into the arrays. FIG. 11 shows the oscillator 300 practiced with outcoupling and feedback assembly 40b (FIG. 4b), however, it may be equally well practiced with the outcoupling and feedback assemblies 40a, 40c, or 40d. Axisymmetric configuration of the AMA module 80 arrays permits integration and packaging of the SSL oscillator 300 into a very compact unit, which becomes more important as increasing number of AMA modules are used. Furthermore, when AMA modules incorporating pressure-clamped laser gain medium are used, the laser gain assembly may be placed into a pressure chamber. The compact configuration of the SSL oscillator 300 permits placing the entire unit into a cylindrical pressure vessel.

Figure 12:
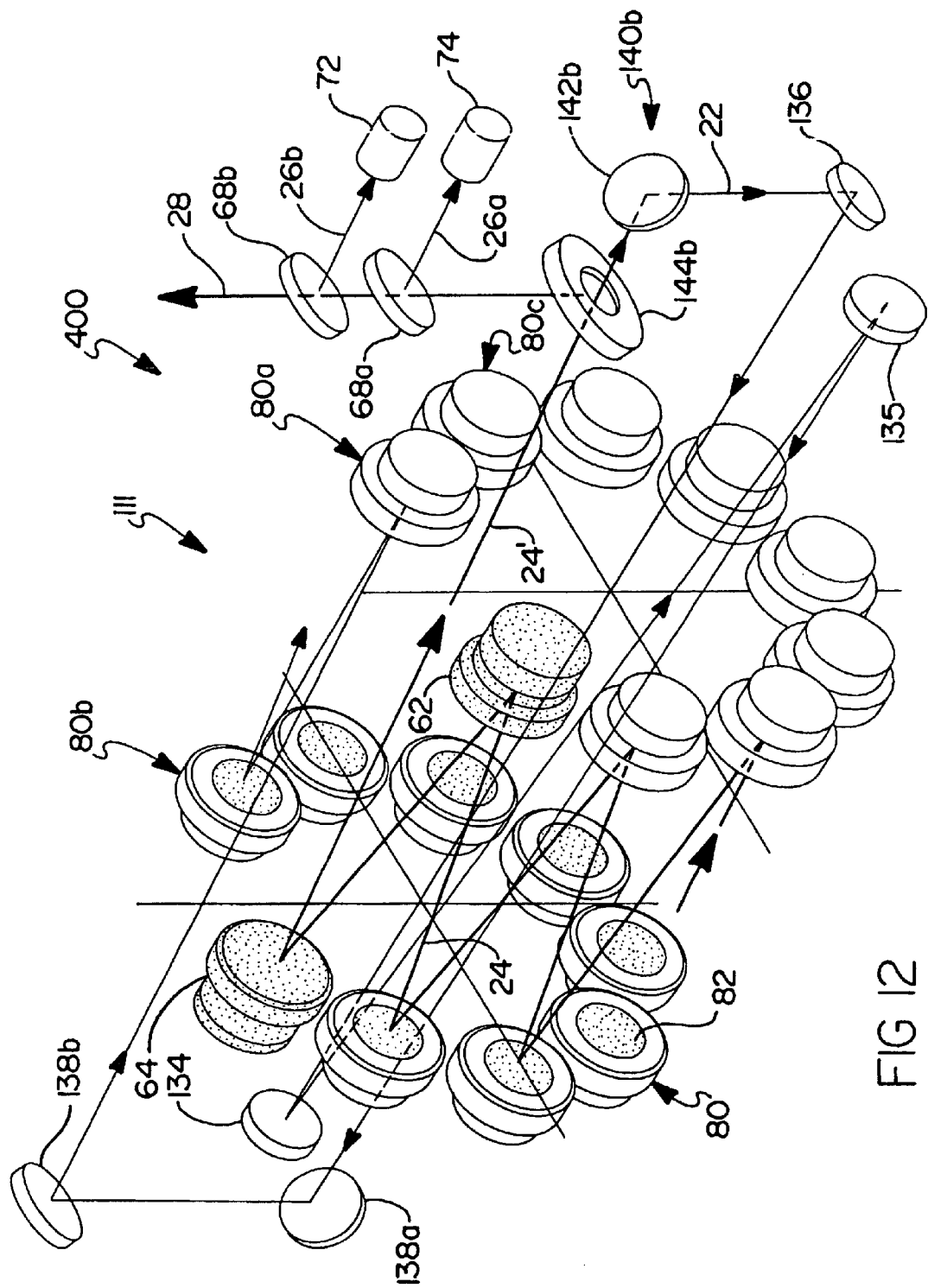
FIG. 12 shows an isometric drawing of a fifth preferred embodiment of the present invention using a ring unstable resonator.

Referring now to FIG. 12, there is shown a solid-state laser oscillator 400 in accordance with a fifth alternative preferred embodiment of the present invention. The SSL oscillator 400 is similar to the SSL oscillator 100 shown in FIG. 7 except that the AMA modules 80 are arranged into two axisymmetric, coaxial arrays facing each other. FIG. 12 shows the laser oscillator 400 practiced with outcoupling and feedback assembly 140b (FIG. 8b). However, it may be equally well practiced with the outcoupling and feedback assembly 140a or 140c. Beam steering mirror 62 and deformable mirror 64 (if used) can also be incorporated into to the arrays.

To assure that the laser beam inside the laser gain assembly 11 can be successfully transferred from one AMA module 80 to the next, all of the AMA modules 80 and beam transfer mirrors 62 and 64 must be properly positioned and aligned. However, positioning and alignment of the AMA modules 80, and in particular the laser gain medium and its support substrate therein (see, e.g. FIGS. 2a and 2b), represents a significant challenge. Opposing AMA modules 80 relaying the laser beam between them are separated by a significant distance, which makes precision positioning and alignment under operational conditions (including external acceleration loads) difficult. One preferred method widely practiced in industry is to mount most (if not all) of the alignment-critical components onto a rigid structure usually known as optical bench. Off-the-shelf commercially available optical benches are normally available in shapes of rectangular blocks, which are too heavy and bulky for use with the fourth and fifth embodiments 300 and 400, respectively, as of the present invention shown in FIGS. 11 and 12, respectively.

Figure 13:
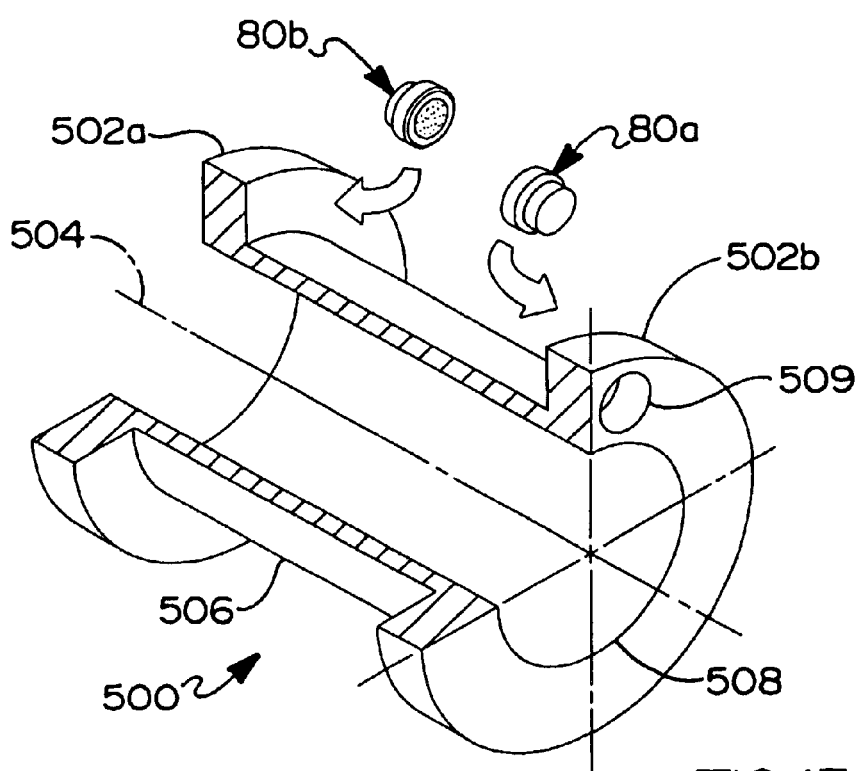
FIG. 13 shows an optical bench suitable for use with the fourth and fifth embodiments of the present invention.

FIG. 13 shows an axisymmetric optical bench 500 suitable for use with the fourth 300 and fifth 400 embodiments of the present invention. The optical bench 500 comprises a central section 506 having the shape of a hollow cylinder and two annular end sections 502a and 502b attached to the opposite ends thereof to form a rigid body symmetric about its axis of symmetry 504. Preferably, the end sections 502a and 502b are constructed from metal honeycomb and the cylindrical central section 506 is constructed either from aluminum or graphite epoxy. AMA modules may be mounted onto inner surfaces of the end sections 502a and 502b as shown, for example, for AMA modules 80a and 80b. Other optical components may also be supported by the optical bench 500. For example, when practiced with the fifth embodiment 400 of the present invention (FIG. 12), steering mirror 62 (if used) and deformable mirror 64 (if used) may also be directly mounted onto the optical bench 500. When practiced with the fourth embodiment 300 of the present invention (FIG. 11), the end mirror 32 and the outcoupling mirror 44b may also be directly mounted onto the optical bench 500.

End sections 502a and 502b may have apertures as may be required, for example, to allow passage of a laser beam, electrical wiring and coolant connections. Aperture 509 in end section 502b is an example of such an aperture for the passage of a laser beam. When practiced with the fifth embodiment of the present invention, central opening 508 may be used to allow passage of a laser beam (for example, between mirrors 134 and 136, and 135 and 138a), and/or electrical wiring and coolant connections.

Figure 14:
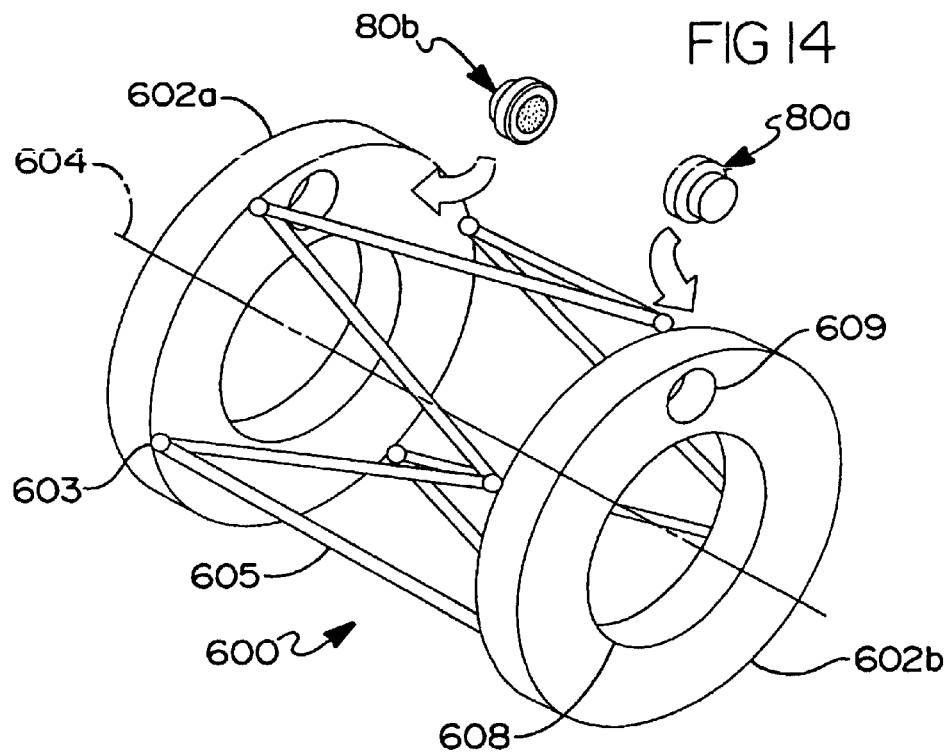
FIG. 14 shows an alternate optical bench suitable for use with the fourth and fifth embodiments of the present invention.

FIG. 14 shows an optical bench 600 of alternate construction. Optical bench 600 comprises two annular end sections 602a and 602b similar to end sections 502a and 502b used with the optical bench 500 placed on a common axis of symmetry 604 and held in position by a plurality of struts 605. Struts 605 are anchored to the end sections 602a and 602b via joints 603. Preferably, end sections 602a and 602b are made of aluminum honeycomb or another suitably strong and lightweight material. Struts 605 are preferably made of graphite epoxy. Optical bench 600 may be formed with a wide variety of configurations of struts 605, which are practiced by optical engineers to maintain relative positioning of large components. The configuration of struts 605 shown in FIG. 14 is known as the Serrurier truss, which is known for its capability to compensate for deflections. Other suitable truss types which may be practiced with the optical bench 600 include the octopod truss, quad-tripod truss, double truss, athermal truss, and two-tier truss. For more information on truss types, see D. Vukobratovich, "Advanced Topics in Opto-Mechanics," Optical Sciences Center, University of Arizona, Tucson, Ariz. (1988).

During laser operation, the laser gain medium generates a significant amount of heat, which is removed by flowing a coolant through the support substrate (see, e.g. FIGS. 2a and 2b). This requires coolant fluid connections to the support substrate that are sufficiently flexible to permit alignment of the laser gain medium but which do not exert a substantial hydraulic load that would hinder alignment of and/or excessively deform the laser gain medium. Furthermore, a positioning mount used with the AMA module mount must avoid causing a significant distortion of the laser gain medium. In addition, such a positioning mount (after it is adjusted) must be sufficiently rigid to provide stable alignment in view of acceleration loads induced by external effects and/or the flow of coolant through the substrate. A suitable positioning mount must also permit thermal expansion of the laser gain medium and the support substrate. Several methods suitable for mounting and positioning AMA modules in a laser oscillator of the present invention have been developed in the prior art for the mounting of precision mirrors. Most notable is the three-point kinematic suspension on flexures as disclosed in D. Vukobratovich, "Introduction to Opto-Mechanical Design," Chapter 5: Mirror Mounting, published by Optical Sciences center of the University of Ariz., Tucson, Ariz. in 1986. Suitable three-point kinematic suspension on flexures is also disclosed by Ahmad et al., in U.S. Pat. No. 4,726,671 (1988).

Coolant fluid connections to the support substrate are preferably provided by pressure-balanced fluid transfer tubes which balance the hydraulic forces caused by the coolant pressure. Such tubes permit small axial and lateral adjustments of the support substrate within an AMA module as may be required to optically align the laser gain medium. In the prior art, such pressure-balanced tubes are disclosed, for example, by Eitel in U.S. Pat. No. 4,029,400 and by Sigman et al., in U.S. Pat. No. 4,175,834 for use with cooled laser mirrors.

Figure 15:
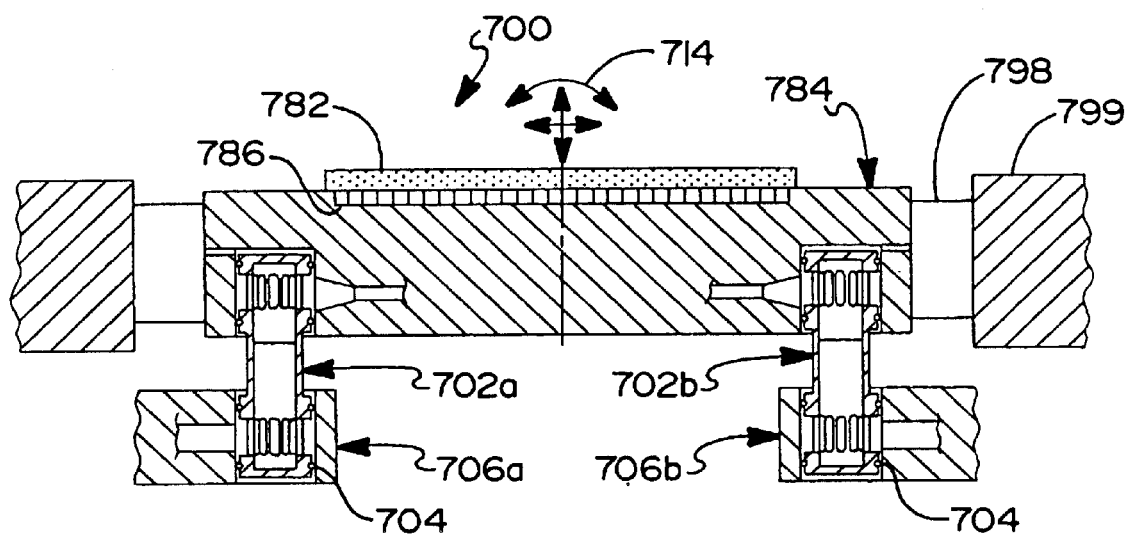
FIG. 15 shows a partial assembly of an AMA modules in a positioning mount and with coolant connections.

FIG. 15 shows a cross-sectional view of a partially assembled AMA module 700 comprising a support substrate 784 supporting a laser gain medium 782 in an AMA configuration. The support substrate 784 is attached to an optical bench 799 via positioning mount 798. The substrate 784 is further connected by a coolant transfer tube 702a to a coolant supply manifold 706a, and by a coolant transfer tube 702b to a coolant return manifold 706b. During normal operation of the AMA module, suitable coolant is provided by the supply manifold 706a to the substrate 784. There it is flowed through heat exchanger 786 to cool the laser gain medium 782, and thereafter discharged into the return manifold 706b.

Figure 16:
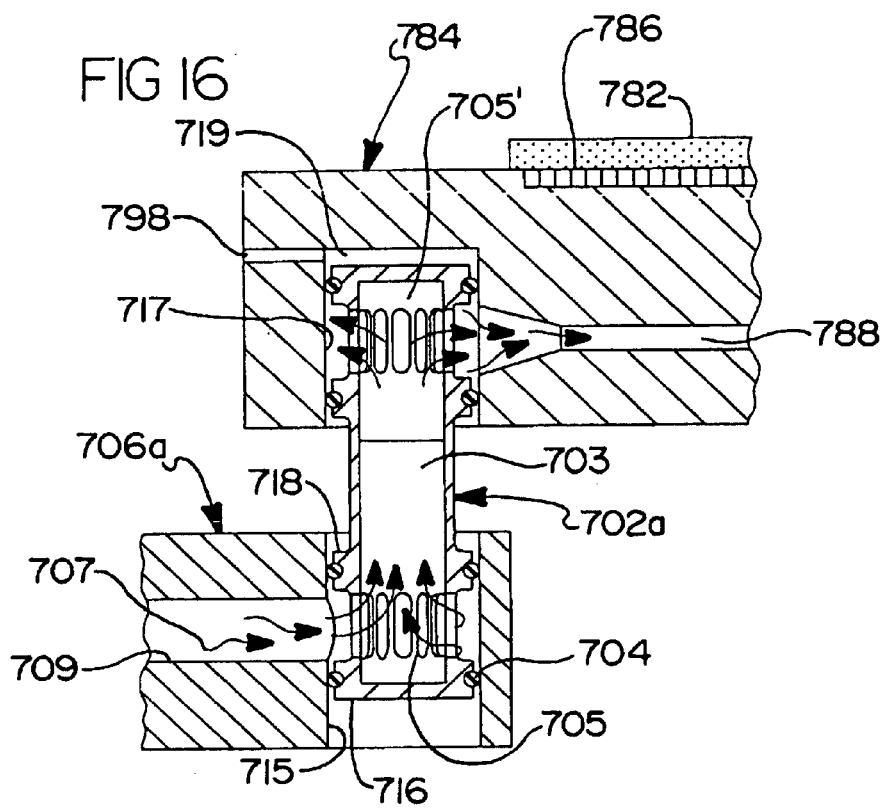
FIG. 16 shows a detail arrangement of a pressure-balanced coolant connection.

Referring now to FIG. 16, there is shown a detailed view of the connection between the coolant supply manifold 706a and the support substrate 784. The coolant supply manifold 706a includes a cylindrical chamber 715 connected to a coolant flow channel 709 flowing a coolant 707. The support substrate 784 contains a cylindrical chamber 717 connected to internal manifold 788, which is in turn connected to heat exchanger 786 (the connection not being shown). A coolant transfer tube 702a has two ends; one end inserted into the cylindrical opening 715 in the coolant supply manifold 706a and the other end inserted into the cylindrical opening 717 in the support substrate 784.

The coolant transfer tube 702 has an internal flow passage 703 connected to the tube exterior by a plurality of openings 705 and 705' located near opposite ends of the flow passage 703. Each end of the coolant transfer tube 702 further contains two raised sections 716 and 718, with the openings 705 therebetween. Each of the raised sections 716 and 718 has an O-ring groove with an O-ring type seal 704 made of a suitable elastomeric material. One end of the coolant transfer tube 702a has two O-rings 704 engaging the cylindrical surface of chamber 715. The other end of the coolant transfer tube 702a has two O-rings 704 engaging the cylindrical surface of chamber 717. The tube 702a is positioned and its length is sized so that openings 705 are aligned with the flow channel 709 in the manifold 706 and openings 705' are aligned with the internal manifold 788 in the support substrate 784. This arrangement of the coolant transfer tube 702a provides a continuous passage for coolant 707 from the flow channel 709 through openings 705, into passage 703, and therefrom through openings 705' into the internal manifold 788 of the support substrate 784. A vent hole 798 is provided to avoid pressure buildup inside a volume 719 at the extreme end of chamber 717.

It has been already established in prior art that the arrangement of coolant transfer tube 702a, coolant manifold 706 and support substrate 784 shown in FIG. 16 avoids hydrostatic pressure of the coolant 707 from inducing significant forces between coolant manifold 706 and substrate 784. Arrangement of the coolant transfer tube 702b shown in FIG. 15 is substantially identical to the coolant transfer tube 702a arrangement shown in FIG. 16. Since the coolant transfer tubes 702a and 702b are engaged with the coolant manifold 706 and the substrate 784 by means of the elastomeric O-ring seals 704, the substrate 784 may make small axial, lateral and angular movements indicated by arrows 714 in FIG. 15 with respect to the manifold 706 as required to position and align the laser gain medium 782. Such movements can be accomplished by the positioning mount 798 without affecting the operation of the fluid transfer tubes 702 or placing significant forces on the substrate 784 from the tubes. Furthermore, positional misalignments between the support substrate 784 and the coolant manifolds 706a and 706b resulting from manufacturing tolerances are easily accommodated.

Figure 17:
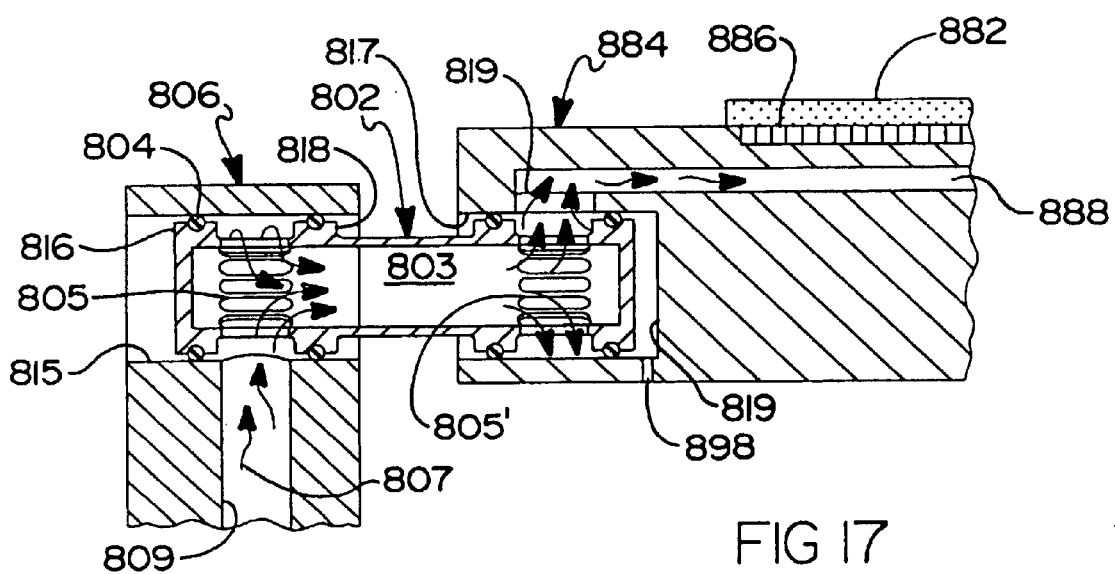
FIG. 17 shows an alternate detail arrangement of a pressure-balanced coolant connection.

The support substrate 784 may have at least one coolant transfer tube for coolant feed to heat exchanger 786 and at least one coolant transfer tube for coolant return. An alternate arrangement of coolant transfer tubes 702a and 702b oriented generally parallel to the face of the laser gain medium 882 is indicated by reference numeral 802 as shown in FIG. 17.

Figure 18:
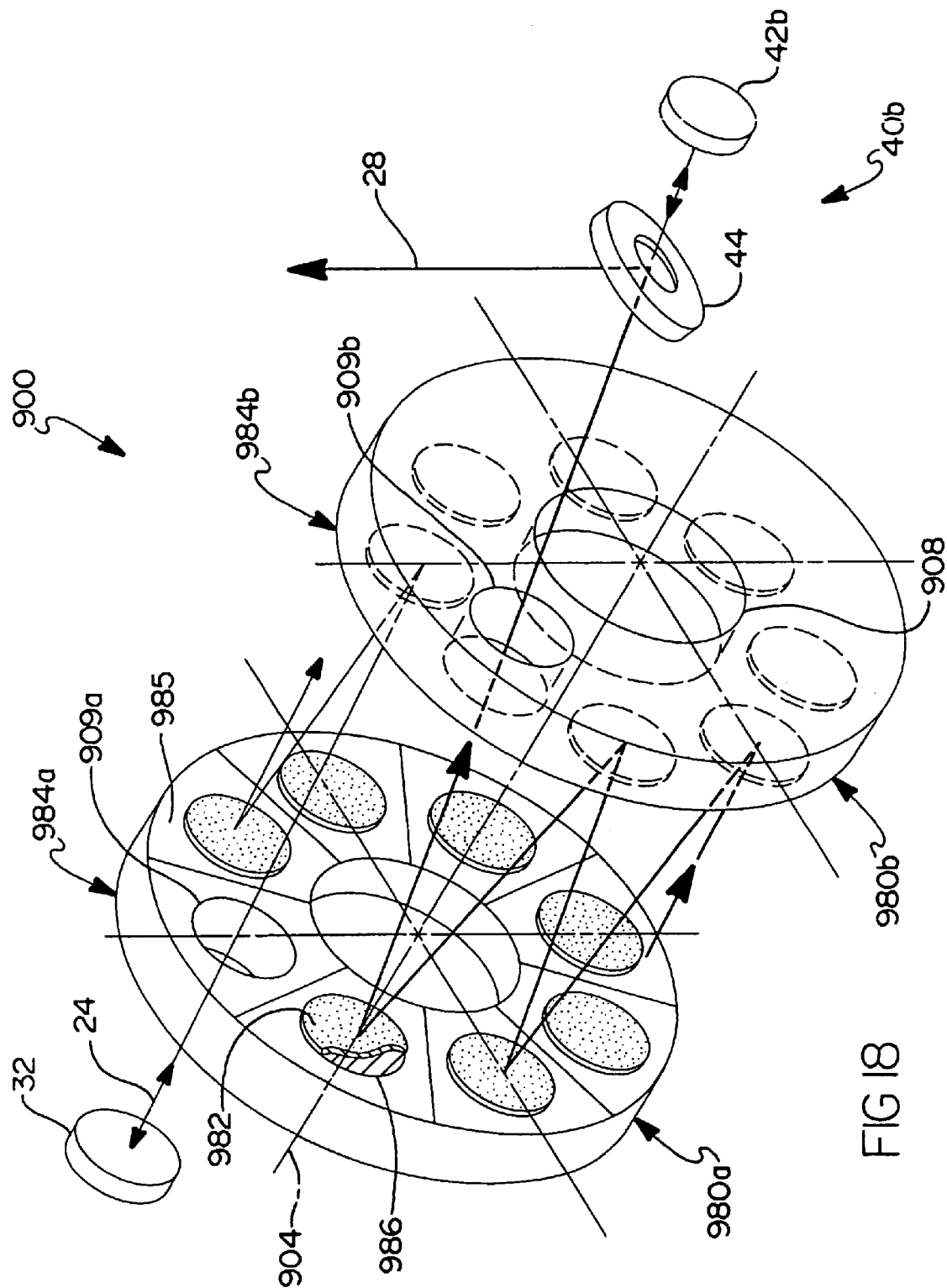
FIG. 18 shows an isometric drawing of a sixth preferred embodiment of the present invention using AMA modules with multiple, axisymmetrically positioned gain elements.

Referring now to FIG. 18, there is shown a solid-state laser oscillator 900 in accordance with a sixth alternative preferred embodiment of the present invention. The SSL oscillator 900 is functionally similar to the SSL oscillator 10 shown in FIG. 3 except that it uses two AMA modules 980a and 980b placed on a common axis of symmetry 904. Each of the AMA modules has multiple laser gain media 982 in an AMA configuration arranged in an axisymmetric array on a common support substrate 984. As already noted, an AMA module having multiple laser gain media on a common support substrate has been disclosed in applicant's co-pending application, U.S. Ser. No. 09/782,788, entitled "High-Average Power Active Mirror Solid-State Laser with Multiple Subapertures," incorporated herein by reference.

The support substrate 984 further contains heat exchangers 986 (one for each laser gain medium 982) supplied with coolant for cooling the back sides of the laser gain media 982 as shown in more detail, for example, for a single laser gain medium in FIG. 15. The face of the support substrate 984 is azimuthally divided into facets 985, each of which is machined flat to optical quality but at a slight angle off perpendicular to the axis of symmetry 904. Such an angle is chosen so that when the laser gain media 982 are mounted onto the support substrate 984 and over the heat exchangers 986 imbedded in the facets 985, and the two AMA modules 980a and 980b are placed on a common axis of symmetry 904 with a predetermined spacing, a laser beam 24 can propagate back and forth between modules 980a and 980b, being successively amplified and reflected by adjacent laser gain media 982.

The number of laser gain media 982 placed on one AMA module 980 is quite arbitrary, but a preferred number is between 3 and 50. The support substrates 984a and 984b are each made very rigid and may be held in their relative position by a plurality of struts such as shown, for example, in FIG. 14. Furthermore, support substrates 984a and 984b may have apertures 909a and 909b as may be required to allow passage of a laser beam 24.

SSL oscillator 900 may also incorporate adaptive optics system 60 such as described earlier and shown in FIG. 5. FIG. 18 shows the oscillator 900 practiced with outcoupling and feedback assembly 40b (FIG. 4b), however, it may be equally well practiced with the outcoupling and feedback assemblies 40a, 40c, or 40d.

SSL oscillator 900 may also practiced with a ring resonator such as disclosed in connection with the fifth embodiment of the present invention. In such a case, central opening 908 in substrate 984 may be used to allow passage of a laser beam (for example, between mirrors 134 and 136, and 135 and 138a), and/or electrical wiring and coolant connections.

Axisymmetric configuration of the laser gain media 982 into arrays on AMA modules 980a and 980b permits integration and packaging of the SSL oscillator 900 into a very compact unit, which becomes more important as increasing number of AMA modules are used. Furthermore, when AMA modules incorporating pressure-clamped laser gain medium are used, the laser gain assembly may be placed into a pressure chamber. The compact configuration of the SSL oscillator 900 permits placing the entire unit into a cylindrical pressure vessel.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A laser oscillator comprising:
   a linear unstable optical resonator formed by at least one at least partially reflecting element, said linear unstable optical resonator operable for recirculating laser radiation at a cavity wavelength to establish a cavity mode of operation;
   an active mirror amplifier in communication with said linear unstable optical resonator, said active mirror amplifier including;
   a substrate;
   a laser gain medium supported by said substrate;
   a flowing coolant for cooling said laser gain medium;
   said coolant being provided to and from said substrate by a plurality of coolant transfer tubes;
   said tubes protecting said substrate from hydrostatic pressure loads resulting from the coolant flowing through said substrate;
   a positioning mount in communication with said substrate for adjusting a position of said laser gain medium; and
   wherein said adjustments can be effected without affecting the operation of said coolant transfer tubes and without exerting significant forces onto the substrate from said coolant transfer tubes.

2. The laser oscillator of claim 1, further comprising:

a coolant supply manifold coupled to said substrate by said coolant transfer tubes; and wherein one of said coolant transfer tubes operates as a coolant supply tube and another one of said coolant transfer tubes operates as a coolant return tube.

3. The laser oscillator of claim 1, wherein:

said substrate comprises a chamber;

said one of said coolant transfer tubes includes at least one O-ring seal disposed therearound, said O-ring seal engaging said chamber to provide a fluid tight seal therebetween.

4. The laser oscillator of claim 1, wherein at least one end of each said coolant transfer tube includes a plurality of spaced apart openings for permitting said coolant to flow therethrough.

5. The laser oscillator of claim 4, wherein each said coolant transfer tube includes:

a raised end portion at each opposite end thereof; and wherein said O-ring seal is disposed over said raised end portion.

6. The laser oscillator of claim 1, wherein at least one of said coolant transfer tubes is coupled to said substrate to extend longitudinally parallel to a longitudinal length of said substrate, and therefore coplanar with said substrate.

7. The laser oscillator of claim 1, wherein each said coolant transfer tube includes:

a pair of raised portions at each opposite end thereof; and a pair of O-ring seals disposed over each raised end portion for sealing each said end portion relative to said substrate.

8. The laser oscillator of claim 7, further comprising a manifold for supplying said coolant to said substrate through one of said coolant transfer tubes, and for receiving said coolant from the other one of said transfer tubes.

9. A laser oscillator system, comprising:

a linear unstable optical resonator formed by at least one partially reflecting element, said resonator operable for recirculating laser radiation at a cavity wavelength to establish a cavity mode of operation;

an active mirror amplifier (AMA) module in communication with said resonator for providing laser amplification of said laser radiation at said cavity wavelength, the AMA module including:

a substrate having a pair of spaced apart chambers and a plurality of fluid channels formed therein in communication with said chambers;

a laser gain medium disposed adjacent to a surface of said substrate and coupled to said substrate;

a coolant circulated through said substrate fluid channels for cooling said laser gain medium;

said coolant being provided to and from said substrate by a pair of pressure-balanced coolant transfer tubes, each of said fluid transfer tubes including one end disposed within a respective one of said chambers in said substrate; and a manifold in fluid communication with said coolant transfer tubes for facilitating a flow of said coolant to and from said substrate.

10. The laser oscillator of claim 9, wherein:

each of said coolant transfer tubes includes at least one O-ring seal for providing a fluid tight seal with its respective said chamber; and each of said fluid transfer tubes including at least one opening at each opposite end thereof for enabling said coolant to flow therethrough.

11. The laser oscillator of claim 9, wherein:

a positioning mount for controlling said adjustments; and wherein said adjustments can be effected without affecting the operation of said coolant transfer tubes and without exerting significant forces onto the substrate from said coolant transfer tubes.

12. The laser oscillator of claim 9, wherein:

each of said coolant transfer tubes includes a pair of O-ring seals at each opposite end thereof.

13. The laser oscillator of claim 9, wherein at least one of said coolant transfer tubes is disposed to extend longitudinally from, and coplanar with, a longitudinal length of said substrate.

14. A laser oscillator comprising:

a linear unstable optical resonator formed by at least one at least partially reflective element, said optical resonator operable for recirculating laser radiation at a cavity wavelength to establish a cavity mode of operation;

a plurality of active mirror amplifier (AMA) modules in communication with said optical resonator, each of said AMA modules, comprising:

a substrate having a plurality of fluid flow channels formed therein;

a laser gain medium supported by said substrate;

a coolant for flowing through said fluid flow channels and cooling said laser gain medium;

said coolant being provided to and from said substrate by a plurality of coolant transfer tubes in flow communication with said fluid flow channels formed in said substrate;

said coolant transfer tubes protecting said substrate from hydrostatic pressure loads resulting from the coolant flowing through said substrate; and a fluid distribution system in flow communication with said coolant transfer tubes for managing the distribution of said coolant to and from said substrate.

15. The laser oscillator of claim 14, wherein said fluid distribution system includes a manifold having a pair of chambers, each one of said chambers being operably associated with said a respective one of said coolant transfer tubes.

16. The laser oscillator of claim 15, wherein:

each of said coolant transfer tubes comprises a pair of O-ring seals, at least one said O-ring seat at each end thereof, for providing a fluid tight seal with its respective said chamber.

17. The laser oscillator of claim 15, further comprising a positioning system for positioning said laser gain medium.

18. The laser oscillator of claim 15, wherein at least one of said coolant transfer tubes extends longitudinally along a longitudinal axis of said substrate.

19. The laser oscillator of claim 14, wherein each said coolant transfer tube includes an opening formed in each end thereof for communicating with said substrate and with said fluid distribution system.

20. The laser oscillator of claim 19, wherein each said coolant transfer tube includes a plurality of said openings spaced apart from one another at each end of said coolant transfer tube.

* * * * *